US012790748B2

(12) United States Patent
Schneiders et al.

(10) Patent No.: US 12,790,748 B2
(45) Date of Patent: Nov. 10, 2026

(54) COMPOSITE ELONGATED BODY

(71) Applicant: AVIENT PROTECTIVE MATERIALS B.V., Geleen (NL)

(72) Inventors: Hans Schneiders, Echt (NL); Peter Roozemond, Echt (NL)

(73) Assignee: AVIENT PROTECTIVE MATERIALS, B.V., Geleen (NL)

( * ) Notice: Subject to any disclaimer, the term of this patent is extended or adjusted under 35 U.S.C. 154(b) by 46 days.

(21) Appl. No.: 18/689,804

(22) PCT Filed: Aug. 30, 2022

(86) PCT No.: PCT/EP2022/074132

§ 371 (c)(1),
(2) Date: Mar. 6, 2024

(87) PCT Pub. No.: WO2023/036656

PCT Pub. Date: Mar. 16, 2023

(65) Prior Publication Data

US 2024/0392080 A1 Nov. 28, 2024

(30) Foreign Application Priority Data

Sep. 7, 2021 (WO) ................. PCT/EP2021/074621
Sep. 7, 2021 (WO) ................. PCT/EP2021/074622
Sep. 7, 2021 (WO) ................. PCT/EP2021/074623
Jul. 6, 2022 (WO) ................. PCT/EP2022/068793
Jul. 6, 2022 (WO) ................. PCT/EP2022/068794

(51) Int. Cl.
*D07B 1/14* (2006.01)
*B66C 1/12* (2006.01)
(Continued)

(52) U.S. Cl.
CPC ................ *D07B 1/142* (2013.01); *B66C 1/12* (2013.01); *C08J 5/046* (2013.01); *C08L 23/06* (2013.01);
(Continued)

(58) Field of Classification Search
None
See application file for complete search history.

(56) References Cited

U.S. PATENT DOCUMENTS 5,902,854 A 5/1999 Kelley et al.
7,823,496 B2 11/2010 Bosman et al.
(Continued)

FOREIGN PATENT DOCUMENTS

CL 2019002788 2/2020
CN 101321907 A 12/2008
(Continued)

OTHER PUBLICATIONS

International Search Report and Written Opinion of the ISA for PCT/EP2022/074132 mailed Dec. 6, 2022, 20 pages.

*Primary Examiner* — Arti Singh-Pandey

(74) *Attorney, Agent, or Firm* — NIXON & VANERHYE P.C.

(57) ABSTRACT

The present invention relates to a composite elongated body (3), comprising high performance polyethylene HPPE filaments (2) having a tenacity of at least 0.6 N/tex and a polymeric composition (10) present throughout the composite elongated body, wherein the polymeric composition comprises a thermoplastic ethylene copolymer and a polysiloxane; and wherein the thermoplastic ethylene copolymer is a copolymer of ethylene and wherein said polymeric composition has a peak melting temperature in the range from 40 to 140° C.

30 Claims, 14 Drawing Sheets

(51) Int. Cl.

| | |
|---|---|
| ***B66C 13/00*** | (2006.01) |
| ***C08J 5/04*** | (2006.01) |
| ***C08L 23/06*** | (2006.01) |
| ***D02G 3/02*** | (2006.01) |
| ***D02G 3/04*** | (2006.01) |
| ***D02G 3/36*** | (2006.01) |
| ***D06M 15/37*** | (2006.01) |
| ***D07B 1/02*** | (2006.01) |

(52) U.S. Cl.
CPC ............... *D02G 3/02* (2013.01); *D02G 3/045* (2013.01); *D02G 3/36* (2013.01); *D07B 1/025* (2013.01); *B66C 13/00* (2013.01); *C08J 2323/06* (2013.01); *C08J 2423/08* (2013.01); *C08J 2483/04* (2013.01); *C08L 2205/16* (2013.01); *D06M 15/37* (2013.01); *D07B 2201/1096* (2013.01); *D07B 2201/2009* (2013.01); *D07B 2201/2012* (2013.01); *D07B 2205/2014* (2013.01); *D07B 2401/2075* (2013.01); *D07B 2501/2015* (2013.01); *D10B 2321/021* (2013.01); *D10B 2401/063* (2013.01)

(56) References Cited

U.S. PATENT DOCUMENTS

| | | | | |
|---|---|---|---|---|
| 7,858,180 | B2 | 12/2010 | Bhatnagar et al. | |
| 8,881,496 | B2 | 11/2014 | Bosman et al. | |
| 10,150,868 | B1 | 12/2018 | Seven et al. | |
| 2007/0202329 | A1 | 8/2007 | Davis et al. | |
| 2009/0269583 | A1 | 10/2009 | Bhatnagar et al. | |
| 2014/0023863 | A1 | 1/2014 | Gijsman et al. | |
| 2014/0272409 | A1 | 9/2014 | Chou | |
| 2019/0040556 | A1 | 2/2019 | Marissen et al. | |
| 2024/0125018 | A1* | 4/2024 | Marissen | D07B 1/025 |

FOREIGN PATENT DOCUMENTS

| | | | |
|---|---|---|---|
| CN | 102471997 | A | 5/2012 |
| EP | 0205960 | A2 | 12/1986 |
| EP | 2424907 | B1 | 5/2019 |
| GB | 1405551 | A | 9/1975 |
| GB | 2042414 | A | 9/1980 |
| GB | 2051667 | A | 1/1981 |
| JP | 53-114920 | | 10/1978 |
| JP | 2001-501655 | A | 2/2001 |
| JP | 2003261765 | A | 9/2003 |
| JP | 2018-529853 | A | 10/2018 |
| JP | 2021-518451 | A | 8/2021 |
| WO | 0173173 | A1 | 10/2001 |
| WO | 2007/062803 | A1 | 6/2007 |
| WO | 2010/126720 | A1 | 11/2010 |
| WO | 2011/015485 | A1 | 2/2011 |
| WO | 2011154383 | A1 | 12/2011 |
| WO | 2013186206 | A1 | 12/2013 |
| WO | 2016001158 | A1 | 1/2016 |
| WO | 2017060461 | A1 | 4/2017 |
| WO | WO 2018/178256 | | 10/2018 |

* cited by examiner

Figure 1
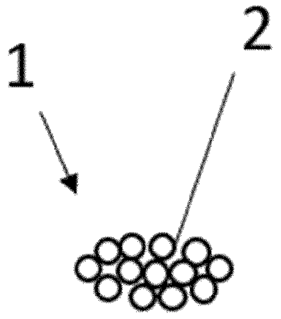
Fig 1a
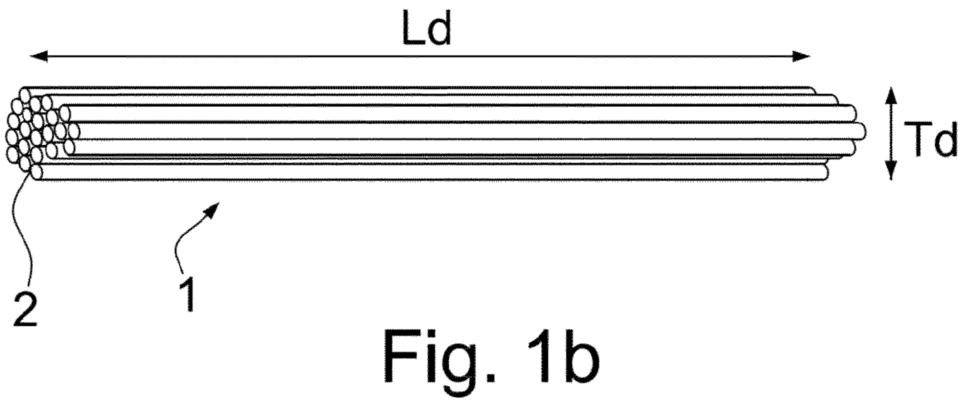
Fig. 1b

Figure 2
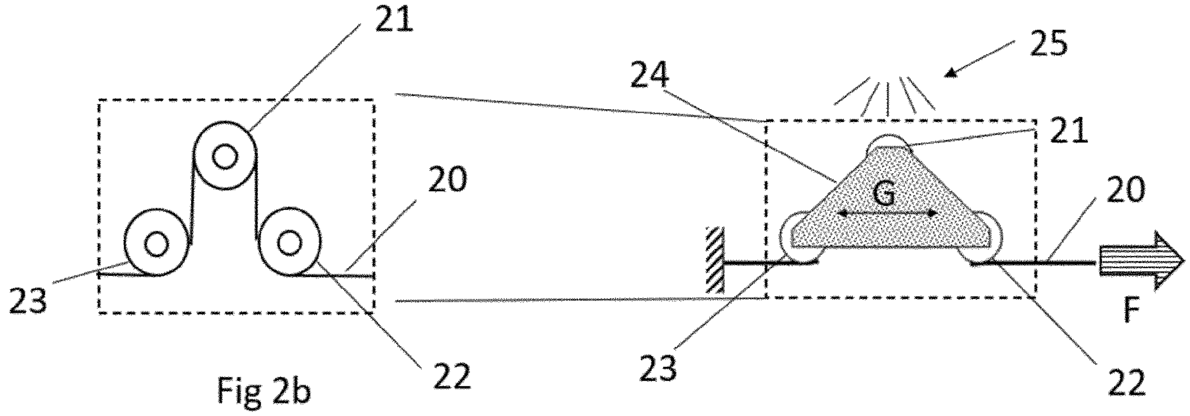
Fig 2b
Fig 2a
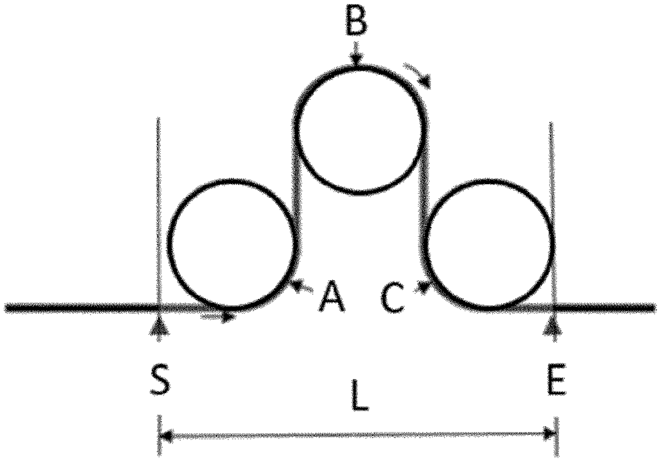
Fig 2c

COMPOSITE ELONGATED BODY

This application is the U.S. national phase of International Application No. PCT/EP2022/074132 filed Aug. 30, 2022 which designated the U.S. and claims priority to EP PCT/EP2021/074622 filed Sep. 7, 2021, EP PCT/EP2021/074623 filed Sep. 7, 2021, EP PCT/EP2021/074621 filed Sep. 7, 2021, EP PCT/EP2022/068793 filed Jul. 6, 2022, and EP PCT/EP2022/068794 filed Jul. 6, 2022, the entire contents of each of which are hereby incorporated by reference.

The present invention concerns a composite elongated body. The present invention further concerns a lengthy body comprising the composite elongated body according to the invention. It also relates to a method of manufacturing the composite elongated body and a method of manufacturing the lengthy body. The present invention also relates to an article comprising the composite elongated body and/or the lengthy body according to the invention and to a method of manufacturing such article. A crane comprising a sheave and a rope comprising the composite elongated body are also part of the invention. The invention further relates to a method of lifting and/or placement of an object and to a use of a polymeric composition.

In many applications, ropes and belts are repeatedly subjected to friction and deformation when in contact with a counter surface. During use a rope is frequently pulled over fairleads, bollards, drums, flanges, pulleys, sheaves, etc., amongst others resulting in, abrasion and bending of the rope. When exposed to such frequent abrasion and bending, a rope may fail due to rope, strand and/or filament damage; fatigue failure is often referred to as abrasive wear or bend fatigue.

HPPE (High Performance Poly Ethylene) fibre ropes with improved bending fatigue have been described in for example WO2007/062803 and WO2011/015485. WO2007/062803 describes a rope constructed from high performance polyethylene fibres and polytetrafluoroethylene fibres. These ropes can contain 3-18 mass % of liquid polyorganosiloxanes. WO2011/015485 describes ropes comprising HPPE fibres coated with a cross-linked silicone rubber. Thus, in the prior art it has been suggested to use silicone compositions alone or in combination with low friction fibres such as PTFE, to reduce the frictional behaviour of the HPPE fibres during bending applications. Especially WO2011/015485 describes a technology that has become established in the field of high end bending applications. WO 2017/060461 concerns a method for producing a lengthy body comprising high performance polyethylene fibres and a polymeric resin and such composite lengthy body.

It is noted that US 2007/202329 relates to improvements in ropes, and in particular to high tenacity synthetic ropes suitable for use in marine applications. It is noted that GB 1 405 551 relates to a size composition, and more particularly to a size composition for application to glass fibers to improve the processing and performance characteristics of glass fibers in glass fiber textiles, in the manufacture of glass fiber-reinforced elastomeric products and in the manufacture of glass fiber-reinforced plastics.

It is noted that U.S. Pat. No. 7,858,180 B2 relates to improvements in ropes, and in particular to high tenacity synthetic ropes suitable for use in various applications.

It is noted that JP 2003 261765 A relates to a processing agent for improving abrasion resistance. The present invention sets out to provide an improved lengthy body such as an improved synthetic rope. In particular an improved rope comprising HPPE filaments, such as a rope constructed from HPPE filaments. A lengthy body according to the invention, such as a rope according to the invention, comprises a composite elongated body according to the invention.

The present invention provides a composite elongated body, comprising high performance polyethylene HPPE filaments having a tenacity of at least 0.6 N/tex and a polymeric composition throughout the composite elongated body, wherein the polymeric composition comprises a) a thermoplastic ethylene copolymer as described herein and b) a polysiloxane as described herein;

and wherein the thermoplastic ethylene copolymer is a copolymer of ethylene and wherein said polymeric composition has a peak melting temperature in the range from 40 to 140° C., measured in accordance with ASTM E794-06.

A rope comprising the composite elongated body according to the invention demonstrates an improved abrasion performance. In an aspect this is demonstrated by an improved wear resistance against a static contra-surface, such as a fairlead.

This improved wear resistance against a static contra-surface may also be referred to as an improved external abrasion. External refers to the outer surface of the rope, the part that is visible to the human eye, or the part that if the rope is held in the hand or is touched by hand is in contact with the hand. This improvement is demonstrated herein for the rope as such without the use of a cover around the outer surface of the rope. The inventors found that the abrasion properties came combined with other improved mechanical properties. Said improvement may be seen for example in an improved repeated bending performance. In particular in an improved Continuous Bending Over Sheave (CBOS) performance. It was found that a rope according to the invention comprising the composite elongated body according to the present invention demonstrates an improved repeated bending over sheave performance.

The composite elongated body according to the invention is a composite material. A composite material is a material made from two or more constituent materials with significantly different physical and/or chemical properties that, when combined, produce a material with characteristics different from the individual components. The individual components remain separate and distinct within the finished structure.

In its simplest form the composite elongated body comprises 2 or more filaments lying side by side without being twisted about each other. The filaments will substantially be oriented in a single direction, the length direction of the composite elongated body.

By fibre is herein understood an elongated body, the length dimension of which is much greater than the transverse dimensions of width and thickness. The term fibre herein includes a filament, such filament may have a regular or irregular cross-section.

A filament is an elongated body, the length dimension of which is much greater than the transverse dimensions of width and thickness. Fibres may have continuous lengths, known in the art as filaments or continuous filaments, or discontinuous lengths, known in the art as staple fibres.

A yarn for the purpose of the invention is an elongated body comprising at least two filaments. The yarn comprises typically at most 10,000 filaments. In an aspect the yarn comprises at most 5000 filaments. The filaments in the yarn may be twisted or untwisted, preferably the filaments of a yarn are untwisted. During coating it is beneficial to have the filaments in the yarn untwisted to improve coating penetration/wetting on the surface on the filaments.

By elongated herein is understood the length dimension being much greater than the transverse dimensions of width and thickness. Preferably said length dimension is at least 10 times, more preferably at least 20 times even more preferably at least 50 times and most preferably at least 100 times greater than the width or thickness dimension whichever is larger. In an aspect the length dimension is from 20 to $1 \times 10^{10}$ times greater than the width or thickness dimension whichever is larger.

A lengthy body herein is understood an elongated body, the length dimension of which is much greater than the transverse dimensions of width and thickness or diameter. Preferably said length dimension is at least 10 times, more preferably at least 20 times even more preferably at least 50 times and most preferably at least 100 times greater than the width or thickness dimension whichever is larger. In an aspect the length dimension of the elongated body is from 20 to $1 \times 10^{10}$ times greater than the width or thickness dimension whichever is larger.

The present invention further provides a composite elongated body, comprising high performance polyethylene HPPE filaments having a tenacity of at least 0.6 N/tex and a polymeric composition throughout the composite elongated body, wherein the polymeric composition comprises a) a thermoplastic ethylene copolymer and b) a lubricant;

and wherein the thermoplastic ethylene copolymer is a copolymer of ethylene and wherein said polymeric composition has a peak melting temperature in the range from 40 to 140° C., measured in accordance with ASTM E794-06.

In an embodiment of the composite elongated body according to the invention the lubricant comprises a polysiloxane such as a polydimethylsiloxane (reactive or non-reactive); a fluorosilicone and other fluoropolymers like PTFE; a wax including a synthetic wax such as PE and PP wax, a silicone wax, an animal wax such as beeswax, a plant wax such as carnauba wax; a synthetic grease or oils; a mineral grease and oils; an inorganic solid such as graphite or molybdenum disulfide; a ceramic such as a ceramic lubricant or ceramic coating; a PUR; an acrylic; a hybrid of PUR and acrylic; or any combination thereof.

In in embodiment of the composite elongated body according to the invention the lubricant is a polysiloxane. A polysiloxane, also called silicone, is an oligomer or a polymer made up of siloxane units. They are mixed inorganic-organic polymers with the chemical formula $[R_2SiO]_n$. These materials consist of an inorganic silicon-oxygen backbone ( . . . —Si—O—Si—O—Si—O— . . . ) with organic side groups attached to the silicon atoms. They are typically colorless oils or rubber-like substances. Some common forms include silicone oil, silicone grease, silicone rubber, silicone resin, and silicone caulk. Polysiloxanes are polymeric materials prepared by the condensation of suitably substituted silanes. In embodiments, the polysiloxane is not crosslinked. In other embodiments, the polysiloxane is crosslinked; for example resulting from functional groups present in the polysiloxane, such as vinyl, hydroxyl, amine, epoxy, acrylamide or isocyanate groups, which may react during and/or after applying the polymeric composition to the filaments of the elongated body.

In an embodiment of the composite elongated body according to the invention the polysiloxane is polydimethylsiloxane (PDMS).

PDMS may be obtained as an aqueous dispersion from different suppliers. The advantage of using a dispersion or emulsion of polysiloxane in present coating composition is that such dispersion may be mixed in different ratios with a dispersion of thermoplastic ethylene copolymer. Examples of suitable polydimethylsiloxane dispersions include Wacker® emulsion C800 or E22 (Wacker Chemie AG, München, DE), and Xiameter™ PMX-200 Silicone Fluid (Dow Inc., US). A polysiloxane may also be a siloxane wax; like Wacker® E 32 silicone wax emulsion, which is a nonionic aqueous emulsion of a silicone wax that is solid at room temperature (melting point 39-45° C.); but which can be readily incorporated into a thermoplastic ethylene copolymer dispersion by stirring.

The polysiloxane used in the present method may be a non-reactive polysiloxane; but can also be a reactive polysiloxane, which comprises a functional group able to react with another compound such as in a cross-linking reaction. Typically, a reactive polysiloxane has at least a reactive pendant group or a reactive end group; which may include a vinyl, hydride, silanol, alkoxy, epoxy, carbinol, (meth)acrylate, mercapto, acetoxy/chlorine/dimethylamine, alkoxide, silsesquioxane, polysilane, or polysilazane group. Preferably, the reactive group includes a vinyl; an hydroxy; an amine; an epoxy; a (meth)acrylamide; a hexenyl; a fluor; or an isocyanate group. In an embodiment, the polysiloxane used in the present method is a reactive polysiloxane having a fluor reactive group. Examples of suitable reactive polysiloxane compositions include Dehesive® 430 (cross-linker) and Dehesive® 440 (catalyst) from Wacker Silicones; Silcolease® Emulsion 912 and Silcolease® catalyst 913 from Bluestar Silicones; and Syl-Off® 7950 Emulsion Coating and Syl-Off® 7922 Catalyst Emulsion from Dow Corning. In embodiments, the polysiloxane used in the present method is a reactive polysiloxane, like the combination Syl-Off® 7950 Emulsion Coating and Syl-Off® 7922 Catalyst Emulsion (Dow Corning).

The aqueous coating composition may contain 0-50 mass % of polysiloxane, based on total coating composition. The aqueous coating composition may contain 0-80 mass % of polysiloxane, based on total coating composition.

In an embodiment the coating composition herein, is an aqueous coating composition. The aqueous coating composition may contain 0.5-20 mass % of polysiloxane, based on total coating composition. In embodiments, polysiloxane is present at a concentration of at least 0.5, at least 1.0, at least 1.5 or at least 2.0 mass % and of at most 15, at most 12, at most 10, at most 8, at most 6 or at most 4 mass %. In an aspect the polysiloxane is present at a mass ratio to the thermoplastic ethylene copolymer of at most 1:3.

In an embodiment the mass ratio of thermoplastic ethylene copolymer to polysiloxane is at most 1:4, at most 1:5 or at most 1:6.

In an embodiment the mass ratio of thermoplastic ethylene copolymer to polysiloxane is at least 1:1, at least 2:1, at least 3:1, at least 4:1 or at least 5:1.

In an embodiment the mass ratio of copolyethylene:silicone in the range from 1:1 to 20:1. In an embodiment the mass ratio of copolyethylene:silicone in the range from 1:1 to 10:1. In an embodiment the mass ratio of copolyethylene:silicone in the range from 2:1 to 5:1.

A suitable polydimethylsiloxane includes Wacker® Ölemulsion C 800 Wacker Chemie AG, München, Germany.

In an aspect the polysiloxane used in the method of the present invention is having a viscosity in the range from 10 Pa·s to 100 Pa·s determined as described in the METHODS section herein. In an aspect the polysiloxane herein is having a viscosity in the range from 10 Pa·s to 100 Pa·s determined as described in the METHODS section herein. An example of an emulsion comprising such polysiloxane includes Wacker® ölemulsion C 800 from Wacker Chemie AG, München, Germany. The viscosity of the non-reactive polydimethylsiloxane of C 800 as determined by the method described in the METHODS section herein is 16.5 Pa·s.

Another example of a polysiloxane having a viscosity in the range from 10 Pa·s to 100 Pa·s determined as described in the METHODS section herein includes Wacker E22 from Wacker Chemie AG, München, Germany. A finely dispersed an-ionic formulation of a high viscous polydimethylsiloxane in water. Solid content 41-44%, pH-value 7.5-8.5.

A benefit of using a polysiloxane, in particular a polydimethylsiloxane, having a viscosity in the range from 10.0 Pa·s to 100.0 Pa·s determined as described in the METHODS section herein includes an improved long term use of a rope (comprising the composite elongated body according to the invention) that is used in an aquatic environment. An example of such rope includes a rope for mooring a ship and/or a marine platform. Without wishing to be bound to theory this benefit may be caused by such siloxane compound providing additional lubrication of the filaments, yarns, sub strands and strands of the rope, consequently reducing frictional wear at the inner and outer part of the rope.

In an aspect the polysiloxane used in the method of the present invention is having a viscosity in the range from 12 Pa·s to 50 Pa·s determined as described in the METHODS section herein, preferably is having a viscosity in the range from 15 Pa·s to 30 Pa·s determined as described in the METHODS section herein.

In an aspect the polysiloxane used in the present invention is having a viscosity of less than 10 Pa·s, such as in the range from 0.01 Pa·s to 9.5 Pa·s, as determined as described in the METHODS section herein. An example of such a polysiloxane emulsion includes DOW XIAMETER™ PMX-200 Silicone Fluid, which is a colourless, clear polydimethylsiloxane fluid.

In an aspect the polysiloxane used in the present invention is having a viscosity of more than 100 Pa·s, such as in the range from 101 to 300 Pa·s, as determined as described in the METHODS section herein. Preferably in the range from 101 to 200 Pa·s to facilitate processability.

In an aspect the polysiloxane used in the present invention is a non-reactive polysiloxane. A non-reactive polysiloxane does not have the potential to react with another compound such as in a cross linking reaction.

In an aspect the polysiloxane used in the present invention is a reactive polysiloxane. A reactive polysiloxane comprises a reactive group having the potential to react with another compound such as in a cross linking reaction. Typically a reactive polysiloxane has at least a reactive pendant group or at least a reactive end group. The reactive group may include Vinyl, Hydride, Silanol, Alkoxy/Polymeric Alkoxide, Epoxy, Carbinol, Methacrylate/Acrylate, Mercapto, Acetoxy/Chlorine/Dimethylamine, Polymeric Alkoxide, Silsesquioxanes, Polysilanes, Polysilazanes.

In an aspect the reactive group includes a vinyl; an hydroxy; an amine; an epoxy; an acrylamide; an hexenyl; a fluor; and an isocyanate group. In an aspect the reactive group includes a butenyl group. In an embodiment polysiloxane used in the present invention is a reactive polysiloxane. wherein the reactive group comprises a fluor. Examples of a reactive polysiloxane coatings include Dehesive® 430 (cross-linker) and Dehesive® 440 (catalyst) from Wacker Silicones; Silcolease® Emulsion 912 and Silcolease® catalyst 913 from Bluestar Silicones; and Syl-off® 7950 Emulsion Coating and Syl-off® 7922 Catalyst Emulsion from Dow Corning. In an embodiment the polysiloxane used in the present invention is a reactive polysiloxane, such as the combination of Syl-off® 7950 Emulsion Coating and Syl-off® 7922 Catalyst Emulsion from Dow Corning. In an aspect the polysiloxane used in the present invention is a functionalized polysiloxane An example of a functionalised polysiloxane includes Wacker W23 silicone Wax, which is an example of a wax functionalised polysiloxane. WACKER® W 23 is a white, waxy polymethylsiloxane that is resistant to hydrolysis and exhibits a very high affinity to various substrates. Melting point 39-45.0° C. Dynamic viscosity (Brookfield, 50° C.) 300 mPa·s. This melting point range may improve lubricating properties and improve performance during use.

The thermoplastic ethylene copolymer and the lubricant, such as the polysiloxane, may be separated by a preparative fractionation method. Typically this could be a separation of components based on molar mass, e.g. using size exclusion chromatography, solubility or based on crystallinity e.g. using Temperature Rising Elution Fractionation. The factions thus obtained may then be analysed using for example IR and/or NMR technique(s).

A first indication of the component may be obtained using elemental analysis, for example to see if silicon (Si) is inside.

The type of lubricant may for example be determined using GC-MS and comparing the retention time and molar mass and compare the fingerprint with a date base.

The skilled person will be able to select, depending on the sample to be tested, suitable sample preparation technique and method. The skilled person would know that if he/she is faced with a finished product, he/she needs to obtain the polymeric composition before doing the density measurement. It is part of the skills of the skilled person to, depending on what the finished product looks like, determine how to obtain and prepare a sample of the polymeric composition and thereafter based on what the sample looks like select the appropriate way to measure the density. For example the polymeric composition may be scraped off from the composite elongated body and analysed. For example the polymeric composition may be scraped off from the lengthy body according to the invention and analysed.

The thermoplastic ethylene copolymer herein is a semi-crystalline polymer has a peak melting temperature in the range from 40 to 140° C., measured in accordance with ASTM E794-06, considering the second heating curve at a heating rate of 10 K/min, on a dry sample. In an embodiment, the peak melting temperature of the thermoplastic ethylene copolymer is at least 50 or 60° C. and at most 130 or 120° C. In an embodiment, the peak melting temperature of the thermoplastic ethylene copolymer is at least 50° C. and at most 130° C. In an embodiment, the peak melting temperature of the thermoplastic ethylene copolymer is at least 60° C. and at most 130° C. In an embodiment, the peak melting temperature of the thermoplastic ethylene copolymer is at least 60° C. and at most 120° C. In an embodiment, the peak melting temperature of the thermoplastic ethylene copolymer is in the range from 50 to 120° C. In an embodiment, the peak melting temperature of the thermoplastic ethylene copolymer is in the range from 50° C. to 120° C. Such peak melting temperatures allow making the composite elongated body with the polymer composition melting and impregnating filaments without negatively affecting the mechanical properties of the high performance polyethylene filaments. The thermoplastic ethylene copolymer may have more than one peak melting temperature. In such case at least the highest melting peak of said melting temperatures falls within the above ranges. A second and/or further peak melting temperature of the copolymer may fall within or outside, preferably below, the temperature ranges. Multiple melting peak may be observed for example if the thermoplastic ethylene copolymer is a blend of different polymers.

The thermoplastic ethylene copolymer may comprise the various forms of ethylene-propylene co-polymers, other ethylene copolymers with co-monomers such as 1-butene, isobutylene, as well as with hetero atom containing monomers such as acrylic acid, methacrylic acid, vinyl acetate, maleic anhydride, ethyl acrylate, methyl acrylate; generally α-olefin and cyclic olefin copolymers, or blends thereof. Preferably the thermoplastic ethylene copolymer is a copolymer of ethylene which may contain as co-monomers one or more olefins having 2 to 12 C-atoms, in particular propylene, isobutene, 1-butene, 1-hexene, 4-methyl-1-pentene, 1-octene, acrylic acid, methacrylic acid and vinyl acetate.

Furthermore, the thermoplastic ethylene copolymer may be a functionalized polyethylene or alternatively the thermoplastic ethylene copolymer may comprise a functionalized polymer. Such functionalized polymers are often referred to as functional copolymers or grafted polymers, whereby the grafting refers to the chemical modification of the polymer backbone mainly with ethylenically unsaturated monomers comprising heteroatoms whereas functional copolymers refer to the copolymerization of ethylene with ethylenically unsaturated monomers. Preferably the ethylenically unsaturated monomer comprises oxygen and/or nitrogen atoms. Most preferably the ethylenically unsaturated monomer comprises a carboxylic acid group or derivatives thereof resulting in an acylated polymer, specifically in an acetylated polyethylene. Preferably, the carboxylic reactants are selected from the group consisting of acrylic, methacrylic, cinnamic, crotonic, and maleic, fumaric, and itaconic reactants. Said functionalized polymers typically comprise between 1 and 10 mass % of carboxylic reactant or more. The presence of such functionalization in the thermoplastic ethylene copolymer may substantially enhance the dispersability of the thermoplastic ethylene copolymer and/or allow a reduction of further additives present for that purpose such as surfactants. By solvent is herein understood a liquid in which at room temperature the thermoplastic ethylene copolymer is soluble in an amount of more than 1 mass % whereas a non-solvent is understood a liquid in which at room temperature the thermoplastic ethylene copolymer is soluble in an amount of less than 0.1 mass %.

The thermoplastic ethylene copolymer has a density as measured according to ISO1183-04 in the range from 860 to 970 kg/m$^3$, preferably from 870 to 930 kg/m$^3$, more preferably from 870 to 920 kg/m$^3$, most preferably from 875 to 910 kg/m$^3$. In an aspect the density of the thermoplastic ethylene copolymer is in the range from 875 to 900 kg/m$^3$ as measured according to ISO1183-04. The inventors identified that thermoplastic ethylene copolymer with densities within said preferred ranges provide an improved balance between the mechanical properties of the composite elongated body and the processability of the coating composition, especially the dried coating composition during the process of the invention.

The thermoplastic ethylene copolymer is a semi-crystalline polymer having a peak melting temperature in the range from 40° C. to 140° C. and typically a heat of fusion of at least 5 J/g, measured in accordance with ASTM E794-06 considering the second heating curve at a heating rate of 10 K/min, on a dry sample and ASTM E793-85, respectively. The thermoplastic ethylene copolymer is a semi-crystalline polyolefin having a peak melting temperature in the range from 40 to 140° C. and typically a heat of fusion of at least 5 J/g, measured in accordance with ASTM E794-06 considering the second heating curve at a heating rate of 10 K/min, on a dry sample and ASTM E793-85, respectively. In a preferred embodiment of the present invention the thermoplastic ethylene copolymer has a heat of fusion of at least 10 J/g, preferably at least 15 J/g, more preferably at least 20 J/g, even more preferably at least 30 J/g and most preferably at least 50 J/g. The inventors surprisingly found that with the increase heat of fusion the composite elongated body showed improved monofilament like character. The heat of fusion of the thermoplastic ethylene copolymer is not specifically limited by an upper value, other than the theoretical maximum heat of fusion for a fully crystalline polyethylene or polypropylene of about 300 J/g. The thermoplastic ethylene copolymer is a semi-crystalline product with a peak melting temperature in the specified ranges. Accordingly is a reasonable upper limit for the thermoplastic ethylene copolymer a heat of fusion of at most 200 J/g, preferably at most 150 J/g. In another embodiment the thermoplastic ethylene copolymer has a peak melting temperature the range from 50 to 130° C., preferably in the range from 60 to 120° C., measured in accordance with ASTM E794-06, considering the second heating curve at a heating rate of 10 K/min, on a dry sample. Such preferred peak melting temperatures provide a more robust processing method to produce the composite elongated body in that the conditions for drying of the composite elongated body do need less attention while composite elongated bodies with good properties are produced. The thermoplastic ethylene copolymer may have more than one peak melting temperatures. In such case at least the highest melting peak of said melting temperatures falls within the above ranges. A second and/or further peak melting temperature of the thermoplastic ethylene copolymer may fall within or outside the temperature ranges. Such may for example be the case when the thermoplastic ethylene copolymer is a blend of polymers.

The thermoplastic ethylene copolymer may have a modulus that may vary in wide ranges. A low modulus thermoplastic ethylene copolymer with for example a modulus of about 50 MPa, will provide very flexible composite elongated bodies with good strength properties. A high modulus thermoplastic ethylene copolymer with for example a modulus of about 500 MPa may provide composite elongated bodies such as monofilaments with improved structural appearance. Each application may have an optimum modulus for the thermoplastic ethylene copolymer, related to the specific demands during the use of the application. The modulus mat be determined as described in the METHODS herein.

The amount of polymeric composition present in the composite elongated body (coating percentage) may vary widely in function of the intended application of the composite elongated body and may be adjusted by the employed method of applying. The amount of polymeric composition in the composite elongated body according to the invention may be determined as described in the METHOD section herein.

In the composite elongated body the surface of the HPPE filaments is substantially (in an aspect at least 50%, at least 60%, at least 70%, at least 90%, at least 95%, or at least 98%) coated (i.e. covered) with the polymeric composition. In an aspect of the composite elongated body the surface of the HPPE filaments is from 70% to 100% coated (i.e. covered) with the polymeric composition. Alternatively one may say the polymeric composition in the composite elongated body is present as a sizer on substantially the entire surface of the HPPE filament.

In an aspect the composite elongated body according to the invention comprises:

a) 60-95 mass % of high-performance polyethylene filaments;

b) 5.0-25 mass % of the thermoplastic ethylene copolymer having a peak melting temperature measured according to ASTM E794-06 of 40-140° C.;

c) 0.1-10 mass % of a polysiloxane; and d) 0-5.0 mass % of other additives;

wherein the sum of components a)-d) is 100 mass %.

a) In an aspect the composite elongated body according to the invention comprises:75-92 mass % of high-performance polyethylene filaments;

b) 7.5-15 mass % of the thermoplastic ethylene copolymer having a peak melting temperature measured according to ASTM E794-06 of 40-140° C.;

c) 0.5-10 mass % of a polysiloxane; and d) 0-5.0 mass % of other additives;

wherein the sum of components a)-d) is 100 mass %.

In an aspect the composite elongated body according to the invention comprises:

a) 80-92 mass % of high-performance polyethylene filaments;

b) 8-12 mass % of the thermoplastic ethylene copolymer having a peak melting temperature measured according to ASTM E794-06 of 40-140° C.;

c) 0.75-8 mass % of a polysiloxane; and d) 0-5.0 mass % of other additives;

wherein the sum of components a)-d) is 100 mass %.

In an aspect the polymeric composition forms a uniform film on the surface of the HPPE filaments. This may be observed via visual analysis e.g. by using SEM on a cross section of the composite elongated body and determining which % of the surface is covered with the coating composition, while using a SEM measurement window of at least 3× the diameter of the filament. Alternatively by making a SEM at 10 locations (evenly distributed over the cross section) to determine which % of the surface is covered with the coating composition.

In an aspect the polymeric composition forms a uniform film on the surface of the HPPE filaments. This may be further be observed via visual analysis e.g. by using SEM on the outer surface of the composite elongated body (this is illustrated in FIG. 11)

The polymeric composition has a density as measured according to ISO1183-04 in the range from 860 to 970 kg/m$^3$, preferably from 870 to 930 kg/m$^3$, more preferably from 870 to 920 kg/m$^3$, most preferably from 875 to 910 kg/m$^3$. In an embodiment the density of the polymeric composition is in the range from 875 to 900 kg/m$^3$ as measured according to ISO1183-04. The inventors identified that a polymeric composition with a density within said ranges provide an good balance between the mechanical properties of the composite elongated body and the processability of the coating composition comprising the thermoplastic ethylene copolymer and the lubricant during manufacturing the composite elongated body of the invention.

In an embodiment the composite elongated body according to according to the invention the lubricant is a polysiloxane as described herein.

In the context of the present invention HPPE filaments are understood to be polyethylene filaments with improved mechanical properties such as tenacity. In a preferred embodiment high performance polyethylene filaments are polyethylene filaments with a tenacity of at least 0.6 N/tex, preferably at least 1.0 N/tex, more preferably at least 1.5 N/tex, more preferably at least 1.8 N/tex, even more preferably at least 2.5 N/tex and most preferably at least 3.5 N/tex. Preferred polyethylene is high molecular weight (HMWPE) or ultrahigh molecular weight polyethylene (UHMWPE). Best results were obtained when the high performance polyethylene filaments comprise ultra-high molecular weight polyethylene (UHMWPE) and have a tenacity of at least 2.0 N/tex, more preferably at least 3.0 N/tex. In an aspect the high performance polyethylene filaments are ultra-high molecular weight polyethylene (UHMWPE) filaments having a tenacity in the range from 2.0 to 5.0 N/tex.

Preferably the composite elongated body of the present invention comprises HPPE filaments comprising high molecular weight polyethylene (HMWPE) or ultra-high molecular weight polyethylene (UHMWPE) or a combination thereof, preferably the HPPE filaments substantially consist of HMWPE and/or UHMWPE. In the context of the present invention the expression ‘substantially consisting of’ has the meaning of ‘may comprise a minor amount of further species’ wherein minor is up to 5 mass %, preferably of up to 2 mass % of said further species or in other words ‘comprising more than 95 mass % of’ preferably ‘comprising more than 98 mass % of’ HMWPE and/or UHMWPE based on the filaments.

In an aspect the composite elongated body of the present invention comprises high molecular weight polyethylene (HMWPE) filaments with a tenacity of at least 0.6 N/tex, preferably at least 1.0 N/tex, more preferably at least 1.5 N/tex, more preferably at least 1.8 N/tex, even more preferably at least 2.5 N/tex and most preferably at least 3.5 N/tex. Best results were obtained when the high performance polyethylene filaments comprise ultra-high molecular weight polyethylene (UHMWPE) and have a tenacity of at least 2.0 N/tex, more preferably at least 3.0 N/tex. In an aspect the composite elongated body of the present invention comprises high molecular weight polyethylene (HMWPE) filaments with a tenacity in the range from 2.0 to 5.5 N/tex. In an aspect t the composite elongated body of the present invention comprises high molecular weight polyethylene (HMWPE) filaments with a tenacity in the range from 2.0 to 5.0 N/tex.

In an aspect the composite elongated body according to the inventions comprises from 2 to $1\times10^9$ (UHMWPE) filaments having a tenacity in the range from 2.0 to 5.0 N/tex.

In an aspect the composite elongated body according to the inventions comprises from 2 to $1\times10^7$ (UHMWPE) filaments having a tenacity in the range from 2.0 to 5.0 N/tex.

In the context of the present invention the polyethylene (PE) of the filament may be linear or branched, whereby linear polyethylene is preferred. Linear polyethylene is herein understood to mean polyethylene with less than 1 side chain per 100 carbon atoms, and preferably with less than 1 side chain per 300 carbon atoms; a side chain or branch generally containing at least 10 carbon atoms. Side chains may suitably be measured by FTIR.

The PE of the filament is preferably of high molecular weight with an intrinsic viscosity (IV) of at least 2 dl/g; more preferably of at least 4 dl/g, most preferably of at least 8 dl/g. Such polyethylene with IV exceeding 4 dl/g are also referred to as ultra-high molecular weight polyethylene (UHMWPE). Intrinsic viscosity is a measure for molecular weight that can more easily be determined than actual molar mass parameters like number and weigh average molecular weights (Mn and Mw). Typically the IV of the PE of the filament is at most 50 dl/g.

The HPPE filaments in the present invention may be obtained by various processes, for example by a melt spinning process, a gel spinning process or a solid state powder compaction process. A preferred method for the production of the filaments used in the invention comprises melt spinning which includes feeding the polyethylene to an extruder, extruding a molded article at a temperature above the melting point thereof and drawing the extruded filaments below its melting temperature. If desired, prior to feeding the polymer to the extruder, the polymer may be mixed with a suitable liquid compound, for instance to form a gel, such as is preferably the case when using ultra high molecular weight polyethylene. In a method for the production of the filaments used in the invention the filaments used in the invention are prepared by a gel spinning process. A suitable gel spinning process is described in for example GB-A-2042414, GB-A-2051667, EP 0205960 A and WO 01/73173 A1. In short, the gel spinning process comprises preparing a solution of a polyethylene of high intrinsic viscosity, extruding the solution into a solution-filaments at a temperature above the dissolving temperature, cooling down the solution-filaments below the gelling temperature, thereby at least partly gelling the polyethylene of the filaments, and drawing the filaments before, during and/or after at least partial removal of the solvent.

Creep is a parameter known in the art and it typically depends on the tension and the temperature applied on a material. Under constant loading HPPE filaments show an irreversible deformation (creep) behavior that is strongly dependent upon load and temperature. High tension and high temperature values typically promote fast creep behavior. The creep may be (partially) reversible or irreversible on unloading. The rate of time dependent deformation is called creep rate and is a measure of how fast the filaments are undergoing said deformation. The initial creep rate may be high but the creep deformation may decrease during constant loading to a final creep rate that may be negligible (e.g. close to zero value).

In an embodiment of the composite elongated body according to the invention the HPPE filaments comprise ultrahigh molecular weight (UHMWPE) having an intrinsic viscosity (IV) of at least 4 dL/g and comprising at least 0.3 short chain branches per thousand total carbon atoms.

In an embodiment of the composite elongated body according to the invention the HPPE filaments comprise ultrahigh molecular weight (UHMWPE) having an intrinsic viscosity (IV) in the range from 4 dL/g to 50 dL/g and comprising from 0.3 to 10 short chain branches per thousand total carbon atoms.

In an embodiment the composite elongated body comprises a yarn comprising high performance polyethylene HPPE filaments having a tenacity of at least 0.6 N/tex, and wherein the yarn has a minimum creep rate of at most $1\times10^{5}$% per second as measured at a tension of 900 MPa and a temperature of 30° C. as described in the METHOD section herein.

In an embodiment of the composite elongated body according to the invention the yarn has a minimum creep rate of at most $4\times10^{-6}$% per second, preferably at most $2\times10^{-6}$% per second, measured at a tension of 900 MPa and a temperature of 30° C. as described in the METHOD section herein.

In an embodiment of the composite elongated body according to the invention the yarn has a minimum creep rate is at least about $1\times10^{-10}$% per second as measured at a tension of 900 MPa and a temperature of 30° C. as described in the METHOD section herein.

The present invention further provides a method of manufacturing a composite elongated body comprising the steps:

a) providing a coating composition, wherein the coating composition comprises
   a thermoplastic ethylene copolymer;
   a water; and
   a polysiloxane;
b) providing at least two HPPE filaments, the filaments having a tenacity of at least 0.6 N/tex;
c) applying the coating composition to the filaments to obtain coated filaments; and
d) elevating the temperature of the coated filaments to obtain the composite elongated body, wherein the weight thermoplastic ethylene copolymer is a copolymer of ethylene and wherein said thermoplastic ethylene copolymer has a peak melting temperature in the range from 40 to 140° C., measured in accordance with ASTM E794-06.

The present invention further provides a method of manufacturing a composite elongated body comprising the steps:

a) providing a coating composition, wherein the composition comprises
   a thermoplastic ethylene copolymer; and
   a lubricant;
b) providing a yarn comprising at least two HPPE filaments having a tenacity of at least 0.6 N/tex;
c) applying the coating composition to the yarn to obtain a coated yarn; and
d) elevating the temperature of the coated yarn to obtain the composite elongated body, wherein the high molecular weight thermoplastic ethylene copolymer is a copolymer of ethylene and wherein said thermoplastic ethylene copolymer has a peak melting temperature in the range from 40 to 140° C., measured in accordance with ASTM E794-06.

In an embodiment of the method of manufacturing the composite elongated body according to according to the invention the lubricant is a polysiloxane as described herein. Therefore present invention further provides a method of manufacturing a composite elongated body comprising the steps:

a) providing a coating composition, wherein the composition comprises
   a thermoplastic ethylene copolymer; and
   a polysiloxane;
b) providing a yarn comprising at least two HPPE filaments having a tenacity of at least 0.6 N/tex;
c) applying the coating composition to the yarn to obtain a coated yarn; and
d) elevating the temperature of the coated yarn to obtain the composite elongated body, wherein the high molecular weight thermoplastic ethylene copolymer is a copolymer of ethylene and wherein said thermoplastic ethylene copolymer has a peak melting temperature in the range from 40 to 140° C., measured in accordance with ASTM E794-06.

In an embodiment of the method of manufacturing the composite elongated body according to according to the invention the lubricant is a polysiloxane as described herein. Therefore present invention further provides a method of manufacturing a composite elongated body comprising the steps:

a) providing a coating composition, wherein the composition comprises a thermoplastic ethylene copolymer; and a polysiloxane;

b) providing a yarn comprising at least two HPPE filaments having a tenacity of at least 0.6 N/tex;

c) applying the coating composition to the yarn to obtain a coated yarn; and d) elevating the temperature of the coated yarn to obtain the composite elongated body, wherein the thermoplastic ethylene copolymer is a copolymer of ethylene and wherein said thermoplastic ethylene copolymer has a peak melting temperature in the range from 40 to 140° C., measured in accordance with ASTM E794-06.

In an embodiment the coating composition herein, is an aqueous polymeric dispersion. By aqueous dispersion is understood that particles of the polymeric composition are dispersed in water, water is acting as non-solvent. The thermoplastic ethylene copolymer present in the applied coating composition, such as an aqueous dispersion, and ultimately present in the obtained composite elongated body of the present invention is a copolymer of ethylene, as described herein.

The concentration of thermoplastic ethylene copolymer in the coating composition may widely vary and is mainly limited by the capability to formulate a stable dispersion of the thermoplastic ethylene copolymer in water. A typical range of concentration is from 2 to 80 mass % of thermoplastic ethylene copolymer in water, whereby the weight percentage is the weight of thermoplastic ethylene copolymer in the total weight of aqueous dispersion. Preferred concentrations are from 4 to 60 mass %, more preferably from 5 to 50 mass %, most preferably from 6 to 40 mass %. Another preferred concentration of the thermoplastic ethylene copolymer in the dispersion is at least 15 mass %, preferably at least 18 mass % and even more preferably at least 20 mass %. In another preferred embodiment the concentration of the thermoplastic ethylene copolymer in the coating composition is from 10 to 50 mass %, preferably from 15 to 40 mass %, most preferably from 18 mass % to 30 mass %. Such preferred higher concentrations of thermoplastic ethylene copolymer may have the advantage of a providing a composite elongated body with higher concentration while reducing the time and energy required for the removal of the water. For some applications a low concentration coating composition, having from 2 to 10 mass % of the thermoplastic ethylene copolymer in the dispersion, may be advantageous for example to increase the wetting and impregnation speed with low viscous suspensions. Last but not least the coating composition concentration and quantity should be chosen to provide a composite elongated body with the required amounts of polymeric composition present in said body.

The coating composition may further comprise additives such as ionic or non-ionic surfactants, tackifying resins, stabilizers, anti-oxidants, colorants or other additives modifying the properties of the polymeric composition or of the prepared composite elongated body. Such additive(s) are also referred to herein as “other additive(s)” or “further additive(s)”.

The application of the coating composition to a yarn comprising the HPPE filaments may be done by methods known in the art and may depend amongst others on the moment the composition is added to the yarn, the nature of the filaments, the concentration and viscosity of the coating composition. The coating composition may for example be applied to the yarn by spraying, dipping, brushing, transfer rolling or the like, especially depending on the intended amount of coating polymeric composition present in the composite elongated body of the invention.

Once the coating composition is applied to the yarn comprising at least two HPPE filaments, the coated yarn is exposed to elevated temperature, for example a hot air oven. In an aspect the coated yarn is at least partially dried at elevated temperature, for example a hot air oven.

In an embodiment of the method of manufacturing a composite elongated body according to the invention during step d) the thermoplastic ethylene copolymer melts.

In an embodiment of the method of manufacturing a composite elongated body according to the invention exposing the coated yarn to elevated temperature in step d) causes the coating composition to dry and the thermoplastic ethylene copolymer to melt.

In an embodiment of the method of manufacturing a composite elongated body according to the invention during step d) the coating composition is dried and the thermoplastic ethylene copolymer melts.

Drying involves the removal, e.g. the evaporation, of at least a fraction of the water present in the coated yarn. Preferably the majority, more preferably essentially all water is removed during the drying, optionally in combination with other components. Drying, i.e. the removal of water, may be done by methods known in the art. Typically the evaporation of water involves an increase of the temperatures of the coated yarn up to or above the boiling point of water. The temperature increase may be assisted or substituted by a reduction of the pressure and or combined with a continuous refreshment of the surrounding atmosphere. Typical drying conditions are temperatures of between 4° and 130° C., preferably 50 and 120° C.

The step d) of exposing the coated yarn to elevated temperature in method of the invention may comprise heating the filaments comprising the coating composition to a temperature in the range from the peak melting temperature of the thermoplastic ethylene copolymer to 153° C. Such heating may be performed before, during and/or after the partially drying the coating composition. Typically heating the filaments comprising the coating composition to a temperature in the range from the peak melting temperature of the thermoplastic ethylene copolymer to 153° C. is done during and/or after at least partially drying the coating composition. In an aspect this heating is done after at least partially drying the coating composition. Heating may be carried out by keeping the coated yarn for a dwell time in an oven set at an elevated temperature, subjecting the impregnated filaments to heat radiation or contacting the body with a heating medium such as a heating fluid, a heated gas stream or a heated surface. In an aspect heating is done in an hot air oven. Preferably, the elevated temperature is at least 2° C., preferably at least 5° C., most preferably at least 10° C. above the peak melting temperature of the thermoplastic ethylene copolymer. In an aspect the elevated temperature is from 2° C. to 100° C. above the peak melting temperature of the thermoplastic ethylene copolymer. At such temperature the thermoplastic ethylene copolymer melts and can adhere to the filaments and fuse the filaments together in a monofilament-like structure, and the composite elongated body is be obtained. In an aspect the elevated temperature is at most 153° C., preferably at most 150° C., more preferably at most 145° C. and most preferably at most 140° C. This upper limit is also referred to herein as maximum temperature. In an aspect the dwell time is preferably between 2 and 100 seconds, more preferably between 3 and 60 seconds, most preferably between 4 and 30 seconds.

In a preferred embodiment of the method of manufacturing a composite elongated body, the heating of the coated yarn overlaps, more preferably is combined with the drying step of the coating composition. It may prove to be practical to apply a temperature gradient in step d) to the coated yarn whereby the temperature is raised from about room temperature to the maximum temperature of the heating step over a period of time during which the coated yarn will undergo a continuous process from drying of the coating composition to at least partially melting of the thermoplastic ethylene copolymer. In an aspect of this method in step d) the elevated temperature is a temperature gradient with an increasing temperature that falls in the range from 20° C. to a temperature at least 2° C., preferably at least 5° C., most preferably at least 10° C. above the peak melting temperature of the thermoplastic ethylene copolymer. In an aspect of this method in step d) the elevated temperature is a temperature gradient having a temperature that increases from a starting temperature in the range from 20° C. to 153° C. to a higher end temperature in the range from 20° C. to 153° C.

In an aspect the composite elongated body a composite elongated body contains more than 50 mass % UHMWPE as described herein. In an aspect the composite elongated body a composite elongated body comprises from 55 to 95 mass % UHMWPE as described herein. A preferred embodiment of the present invention concerns a composite elongated body containing more than 70 mass % UHMWPE as described herein, preferably 80 mass % of UHMWPE, preferably more than 90 mass % of UHMWPE, whereby the mass % are expressed as mass of UHMWPE to the total mass of the composite elongated. In a yet preferred embodiment, the UHMWPE present in the composite elongated body is comprised in the HPPE filaments of said composite elongated body. In an embodiment the composite elongated body a composite elongated body comprises from 55 to 95 mass % UHMWPE in the form of HPPE filaments. In an embodiment the composite elongated body according to the invention, said composite elongated body comprises at least 80 mass % UHMWPE present in the form of HPPE filaments. In an embodiment the composite elongated body according to the invention, said composite elongated body comprises at least 85 mass % UHMWPE present in the form of HPPE filaments. In an embodiment the composite elongated body according to the invention, said composite elongated body comprises from 85 mass % to 95 mass % UHMWPE present in the form of HPPE filaments.

The present invention also relates to the composite elongated body produced with the method of manufacturing a composite elongated body according to the invention. Such composite elongated body comprises HPPE filaments as defined herein and a polymeric composition comprising a thermoplastic ethylene copolymer and a lubricant as defined herein, wherein the thermoplastic ethylene copolymer is a copolymer of ethylene as defined herein. In an aspect such composite elongated body comprises HPPE filaments as defined herein and the polymeric composition as defined herein comprising the thermoplastic ethylene copolymer as defined herein and the polysiloxane as defined herein. Such composite elongated body is subject to the preferred embodiments and potential advantages as discussed above or below in respect of the present inventive method, whereas the preferred embodiments for the composite elongated body potentially apply vice versa for the inventive method of manufacturing the composite elongated body.

The present invention further relates to a lengthy body comprising the composite elongated body according to the invention as described herein. The term lengthy body includes but is not limited to a strand, a cable, a cord, a rope, a belt, a strip, a hose and a tube. In an aspect the lengthy body comprises from 2 to 100,000 composite elongated bodies according to the invention. In an aspect the lengthy body comprises from 3 to 10,000 composite elongated bodies according to the invention. In an aspect the lengthy body comprises from 5 to 5000 composite elongated bodies according to the invention. A lengthy body herein is understood an elongated body, the length dimension of which is much greater than the transverse dimensions of width and thickness or diameter. Preferably said length dimension is at least 10 times, more preferably at least 20 times even more preferably at least 50 times and most preferably at least 100 times greater than the width or thickness dimension of the lengthy body, whichever is larger. The cross-sectional shape of the lengthy body may be from round or almost round, oblong or rectangular shape.

In its simplest form the lengthy body comprises 2 or more composite elongated bodies lying side by side without being twisted about each other. Such thread of untwisted composite elongated bodies may also be called a bundle and as elaborated above may have a variety of cross-sectional shapes. The composite elongated bodies in a bundle will substantially be oriented in a single direction, the length direction of the lengthy body. Furthermore, a thread may be comprised of two or more twisted composite elongated bodies. The lengthy body according to the invention typically demonstrates an improved abrasion resistance. An improved abrasion resistance may be demonstrated in an fairlead abrasion test, such as the fairlead test described in the METHOD section herein. The lengthy body according to the invention typically demonstrates an improved bending performance. An improved bending performance may be demonstrated in an Continuous Bending Over Sheave (CBOS) test, such as a CBOS test described in THE METHODS herein. CBOS is also known to the skilled person as Cyclic Bending Over Sheave.

The present invention relates to a rope comprising at least three composite elongated bodies according to the invention. In an aspect the rope comprises from 3 to 1000 composite elongated bodies according to the invention. In an aspect the rope comprises from 3 to 10,000 composite elongated bodies according to the invention. In an aspect the rope comprises from 3 to 15,000 composite elongated bodies according to the invention. In an aspect the rope comprises from 3 to 100,000 composite elongated bodies according to the invention. The rope according to the invention demonstrates an improved abrasion resistance. An improved abrasion resistance may be demonstrated in a fairlead abrasion test, such as the fairlead test described in the METHOD section herein. In an aspect the rope according to the invention demonstrates an improved abrasion resistance as compared with a reference rope, preferably wherein the reference rope is a rope without the polymeric composition as defined herein. In an aspect the rope according to the invention demonstrates an improved abrasion resistance as compared with a reference rope wherein the reference rope is a rope comprising a thermoplastic ethylene copolymer as defined in any preceding embodiment and lacking the lubricant as defined herein, in particular lacking the polysiloxane as defined herein. In an aspect the rope according to the invention demonstrates, if measured under the same conditions, an improved abrasion resistance compared with a reference rope, wherein the reference rope is a rope comprising high performance polyethylene HPPE filaments having a tenacity of at least 0.6 N/tex, a thermoplastic ethylene copolymer as defined herein and lacking the polysiloxane as defined herein.

The rope according to the invention typically demonstrates an improved bending performance. An improved bending performance may be demonstrated in a Continuous Bending Over Sheave (CBOS) test, such as a CBOS test described in THE METHODS herein. In an aspect the rope according to the invention demonstrates an improved bending performance as compared with a reference rope, preferably wherein the reference rope is a rope without the polymeric composition as defined herein. In an aspect the rope according to the invention demonstrates an improved bending performance as compared with a reference rope wherein the reference rope is a rope comprising a thermoplastic ethylene copolymer as defined in any preceding embodiment and lacking the lubricant as defined herein, in particular lacking the polysiloxane as defined herein. In an aspect the rope according to the invention demonstrates, if measured under the same conditions, an improved bending performance compared with a reference rope, wherein the reference rope is a rope comprising high performance polyethylene HPPE filaments having a tenacity of at least 0.6 N/tex, a thermoplastic ethylene copolymer as defined herein and lacking the polysiloxane as defined herein.

In an embodiment the rope according to the invention comprises the composite elongated body according to the invention in an amount in the range from 80 mass % to 100 mass % based on the total weight of the rope. In a preferred aspect 90 mass % to 100 mass % based on the total weight of the rope. The total weight of the rope here refers to the weight of the rope without a cover if any. In an aspect the rope consists of assembled composite elongated bodies according to the invention.

In a preferred embodiment of the rope according to the invention, the rope comprises ultra-high molecular weight polyethylene (UHMWPE) filaments, more preferably gel spun UHMWPE filaments. In a further aspect, at least 50 mass %, more preferably at least 80 mass % and even more preferably at least 90 mass % and most preferably all of the high performance polyethylene filaments present in the rope are UHMWPE filaments.

The rope according to the invention may be of various constructions, including laid, braided, parallel, and wire rope-like constructed ropes. In general a rope is composed of strands, typically laid or braided strands. The number of strands in the rope may also vary widely, but is generally at least 3 and preferably at most 16, to arrive at a combination of good performance and ease of manufacture. The number of strands in a braided rope according to the invention is preferably at least 3. There is no upper limit to the number of strands, although in practice ropes will generally have no more than 32 strands. Particularly suitable are ropes of an 8- or 12-strand braided construction. Such ropes provide a favourable combination of tenacity and resistance to bend fatigue, and may be made economically on relatively simple machines.

Typically a rope has a cross-section that is about circular or round, but also a rope having an oblong cross-section, meaning that the cross-section of a tensioned rope shows a flattened, oval, or even (depending on the number of primary strands) an almost rectangular form, is known. Such oblong cross-section preferably has an aspect ratio, i.e. the ratio of the larger to the smaller diameter (or width to thickness ratio), in the range of from 1.2 to 4.0.

A preferred embodiment of the present invention concerns a lengthy body comprising the composite elongated body according to the invention and containing more than 70 mass % UHMWPE as described herein, preferably 80 mass % of UHMWPE, preferably more than 90 mass % of UHMWPE, whereby the mass % are expressed as mass of UHMWPE to the total mass of the lengthy body. In a yet preferred embodiment, the UHMWPE present in the lengthy body is comprised in the HPPE filaments of said composite elongated body.

In an embodiment the lengthy body according to the invention is constructed from composite elongated bodies according to the invention.

The composite elongated body according to the invention may for example be used in the manufacture of a lengthy body such as a rope. The composite elongated body according to the invention may for example be used in the manufacture of an article such as a net, for example a fishing net or an aquaculture net (typically to grow fish); a sling, such as a round sling, a webbing sling or a rope sling; a synthetic chain link; a synthetic chain or a tendon.

Therefore an aspect of the present invention includes an article according to the invention comprising the composite elongated body according to the invention, such as a net (for example a fishing net or an aquaculture net comprising the composite elongated body), a sling, a synthetic chain or a tendon comprising the composite elongated body according to the invention. The article according to the invention according to the invention typically demonstrates an improved abrasion resistance and/or an improved overall durability. The article according to the invention may comprise from 2 to 100.000 composite elongated bodies according to the invention.

In an embodiment of the present invention the article according to the invention comprises the composite elongated body according to the invention and contains more than 70 mass % UHMWPE, preferably 80 mass % of UHMWPE, preferably more than 90 mass % of UHMWPE, whereby the mass % are expressed as mass of UHMWPE to the total mass of the article. In a yet preferred embodiment, the UHMWPE present in the article is comprised in the HPPE filaments of said article. In an embodiment the article is constructed from composite elongated bodies. In an embodiment the synthetic chain link according to the invention comprises from 2 to 10,000 composite elongated bodies according to the invention.

A synthetic chain link according to the invention comprises the at least one composite elongated body according to the invention.

A synthetic chain according to the invention comprises the composite elongated body according to the invention. In an embodiment the synthetic chain according to the invention comprises at least two interconnected synthetic chain links according to the invention. In an embodiment the synthetic chain according to the invention comprises from 2 to 10,000 interconnected synthetic chain links according to the invention. In an embodiment the synthetic chain according to the invention comprises from 2 to 2000 interconnected synthetic chain links according to the invention. In an embodiment the synthetic chain according to the invention comprises from 2 to 1000 interconnected synthetic chain links according to the invention. In an embodiment the synthetic chain according to the invention comprises at least two interconnected synthetic chain links wherein at least a part of the links comprise the composite elongated body according to the invention. In an embodiment the synthetic chain according to the invention comprises a plurality of interconnected chain links wherein at least a part of the links comprise the composite elongated body according to the invention. In an embodiment the synthetic chain according to the invention comprises a plurality of interconnected chain links wherein each link comprises the composite elongated body according to the invention. The chain according to the invention is typically suitable to moor or anchor boats, to lash cargo in road, rail, water and air transportation and suitable for conveying, hoisting, suspending and lifting applications. The synthetic chain according to the invention according to the invention may have an improved resistance to particle ingress, resistance to abrasion resistance and/or an improved overall durability.

In an aspect the article according to the invention is a personal protection item (such as a helmet, a body panel) or a glove comprising at least one composite elongated body as described herein. In an aspect the article according to the invention is a personal protection item (such as a helmet, a body panel) or a glove comprising from 1 to 5.000 composite elongated bodies as described herein. In an aspect the article according to the invention is a personal protection item (such as a helmet, a body panel) or a glove comprising from 1 to 10,000 composite elongated bodies as described herein.

The present invention further relates to a belt comprising at least three composite elongated bodies according to the invention. A belt is a loop of flexible material generally used to link two or more rotating shafts mechanically, most often parallel. Belts may be used as a source of motion, to transmit power efficiently or to track relative movement. In an aspect the belt according to the invention demonstrates an improved bending performance as compared with a reference belt, preferably wherein the reference belt is a belt without the polymeric composition as defined herein. In an aspect the belt according to the invention demonstrates an improved bending performance as compared with a reference belt wherein the reference belt is a belt comprising a thermoplastic ethylene copolymer as defined in any preceding embodiment and lacking the lubricant as defined herein, in particular lacking the polysiloxane as defined herein. In an aspect the belt according to the invention demonstrates, if measured under the same conditions, an improved bending performance compared with a reference belt, wherein the reference belt is a belt comprising high performance polyethylene HPPE filaments having a tenacity of at least 0.6 N/tex, a thermoplastic ethylene copolymer as defined herein and lacking the polysiloxane as defined herein.

The present invention further relates to a net, such as a net for fishing or fish farming, comprising at least one composite elongated body as described herein. The present invention further relates to a net comprising at least three composite elongated bodies according to the invention. The net may comprise up to 1000 composite elongated bodies according to the invention. A practical upper limit of the number of composite elongated bodies in the net is eight, preferably seven, six or five. A net herein may comprise 1, 2, 3, 4, 5, 6, 7 or 8 composite elongated bodies according to the invention.

A benefit of polydimethylsiloxane in the polymeric composition may include improvement in long term use of nets comprising the composite elongated body, when used in an aquatic environment. Without wishing to be bound to any theory, enhanced durability may be caused by reduced abrasion between filaments and composite elongated bodies in the at least one cord or between cords of the net.

In embodiments of present disclosure, the net is to be applied in fish farming, and is also called an aquaculture net. Such nets are known to the skilled person, and may have widely varying dimensions, mass, construction, and number and type of cords. The cords of present net can be joined by techniques such as knots or clamps, but the joints may also be made as integral part of the process of net making from cords. Typically, the net will have a mesh size of at least 8 mm, preferably at least 10, at least 12, at least 14 or at least 16 mm. The maximum mesh size of the net of the present disclosure is not particularly limited, and may be at most 500 mm, preferably at most 400, at most 300, at most 200, at most 100, at most 90, at most 80, at most 70, or at most 60 mm depending for example on the type of fish and conditions of use. Mesh size of a knotted net is generally determined as the full mesh knot to knot distance, i.e. the distance from center to center of 2 adjacent knots of a mesh. In case of a knotless net, e.g. made using interbraiding, the mesh size is the distance between two joints as measured across the space of a mesh taking the distance between two opposite joints as further described in the METHODS.

The construction of the cords of the nets of the invention are not specifically limited and may be amongst others braided, laid or parallel arrangements of a single or multiple composite elongated bodies.

In an embodiment, the net according to the invention is a knitted knotless net, often referred to as Raschel net, comprising at least one composite elongated body according to the invention. In an embodiment, the net according to the invention is a knitted knotless net, often referred to as Raschel net, comprising from 1 to 1000 composite elongated body according to the invention. In such embodiment, the knotless net is made by a knitting technique, such as by warp knitting using a Raschel frame. FIG. 8*a* shows as an example a part of such a knitted knotless net, having hexagonal meshes and joints formed by intermingled cords. In an aspect the net comprises cords joined in a net mesh, wherein each cord comprises one or more composite elongated bodies according to the invention. In another embodiment, the net according to the invention is a Raschel net, comprising at least one cord, the cord comprising at least one composite elongated body according to the invention, preferably one, two or three composite elongated bodies. In another embodiment, the net according to the invention is a Raschel net, comprising at least two cords, each cord comprising one, two or three composite elongated bodies, for example at least one cord as the warp yarn and at least one cord as the weft yarn. In another embodiment, the net is a knitted knotless net made from three composite elongated bodies. A practical upper limit of the number of composite elongated bodies per cord is three. If the cords in a Raschel net, comprise more than on composite elongated body, such cord usually comprises parallel composite elongated bodies.

In embodiments the net is a braided net, preferably a braided knotless net, wherein the cords comprise at least one composite elongated body, such as 1 composite elongated body or 2 or 3 composite elongated bodies as described herein. In embodiments the net is a braided net, preferably a braided knotless net, wherein the cords have 4 composite elongated bodies, or 8, 12, 16, 20 or 24 composite elongated bodies.

In one embodiment, the net construction comprises cords that are braids comprising at least three composite elongated bodies. Braids and braiding processes are well known. Commonly a braid is formed by crossing over a number of elongated bodies diagonally so that each elongated body passes alternately over and under one or more of the other elongated bodies to form a coherent cord.

An alternative but also beneficial net construction, the construction comprises twisted cords instead of braided cords, in which two composite elongated bodies are twisted together to form a cord.

The cords of the net of the invention can be joined by standard techniques such as knots, shackles or interbraiding. It is preferred that the net of the invention is a knotless net. A knotless construction of the net typically results in a further improvement of the net robustness against pressure washing and especially retention of the mesh breaking strength as compared to a construction in which the cords are joint by other means such as knots or shackles.

The present invention also relates to a crane. A crane is a type of machine, generally equipped with a rope or chain, and sheaves, that can be used both to lift and lower materials and to move them horizontally. It is mainly used for lifting heavy things and transporting them to other places. Cranes are commonly employed in the transport industry for the loading and unloading of freight, in the construction industry for the movement of materials, and in the manufacturing industry for the assembling of heavy equipment. The crane according to the invention comprises a sheave and the lengthy body according to the invention, such as a rope according to the invention. In an aspect the crane according to the invention comprises a sheave and a rope, the rope comprising at least three composite elongated bodies as described herein. In an aspect the crane according to the invention comprises a sheave and the belt according to the invention. In an aspect the crane according to the invention comprises a sheave and the chain according to the invention. The crane according to the invention comprises a winch and the lengthy body according to the invention, such as the rope according to the invention.

A fairlead is a device to guide a line, rope or cable around an object, out of the way or to stop it from moving laterally. Typically a fairlead will be a ring or hook. The fairlead may be a separate piece of hardware, or it could be a hole in the structure. An additional use on boats is to keep a loose end of line from sliding around the deck. While fairleads are most frequently found in nautical applications, they can be found anywhere rigging is used. In off-roading, a fairlead is used to guide the winch cable and remove lateral strain from the winch.

The present invention also relates to a marine vessel, a sailing vessel, a boat, a ship or a marine platform comprising a fairlead and a rope according to the invention. The present invention also relates to a vehicle, such as a car, a truck, an aircraft, a train or a tram comprising a fairlead and the rope according to the invention. A boat is a watercraft of a large range of types and sizes, but generally smaller than a ship, which is distinguished by its larger size, shape, cargo or passenger capacity, or its ability to carry boats. A ship is a large watercraft that travels the world's oceans and other sufficiently deep waterways, carrying goods or passengers, or in support of specialized missions, such as defense, research and fishing. A marine platform herein includes without limitation an oil platform, offshore platform, and an offshore drilling rig.

The present invention further provides a method of manufacturing an article comprising the step of creating/producing the article from the lengthy body and/or the composite elongated body, preferably the article is a net, a synthetic chain, a personnel protection item or a glove.

The present invention provides a use of the polymeric composition as defined herein to improve bending performance of a rope, a synthetic chain or a belt comprising such composition.

In an aspect the present invention provides a use of the polymeric composition comprising:

a) a thermoplastic ethylene copolymer, wherein the thermoplastic ethylene copolymer is a copolymer of ethylene and wherein said polymeric composition has a peak melting temperature in the range from 40 to 140° C., measured in accordance with ASTM E794-06; and
b) a polysiloxane to improve bending performance of a rope, a synthetic chain or a belt comprising such polymeric composition compared to a rope or belt without, i.e. not comprising, such polymeric composition when measured under the same conditions, wherein the rope, synthetic chain or belt comprises high performance polyethylene HPPE filaments having a tenacity of at least 0.6 N/tex.

In particular the present invention provides a use of the polymeric composition comprising:

a) a thermoplastic ethylene copolymer, wherein the thermoplastic ethylene copolymer is a copolymer of ethylene and wherein said polymeric composition has a peak melting temperature in the range from 40 to 140° C., measured in accordance with ASTM E794-06; and
b) a polysiloxane;

to improve bending performance of a rope, a synthetic chain or a belt comprising:

high performance polyethylene HPPE filaments having a tenacity of at least 0.6 N/tex; and
the polymeric composition;

compared to a rope, a synthetic chain or a belt comprising comprising the HPPE filaments and the thermoplastic copolymer and lacking the polysiloxane, when measured under the same conditions.

The present invention further relates to the use of the coating composition as defined herein for improving bending performance of a lengthy body according to the invention.

The present invention further relates to the use of the coating composition as defined herein for improving bending performance of a rope.

The present invention provides a use of the coating composition as defined herein to improve bending performance of a rope, a synthetic chain or a belt, wherein the coating composition has been used in the process towards obtaining the rope, the synthetic chain or the belt.

In an aspect the present invention provides a use of the coating composition comprising:

a) the thermoplastic ethylene copolymer, wherein the thermoplastic ethylene copolymer is a copolymer of ethylene and wherein said polymeric composition has a peak melting temperature in the range from 40 to 140° C., measured in accordance with ASTM E794-06; and
b) the polysiloxane;
c) and water;

to improve bending performance of a rope, a synthetic chain or a belt comprising:

high performance polyethylene (HPPE) filaments having a tenacity of at least 0.6 N/tex; and
the thermoplastic ethylene copolymer and the polysiloxane;

compared to a rope, a synthetic chain or a belt comprising the HPPE filaments and the thermoplastic copolymer and lacking the polysiloxane, when measured under the same conditions.

Bending performance may be measured as described herein. A suitable method includes a cyclic bending over sheave (CBOS) test, such as the CBOS 5 mm test as described herein.

The present invention relates to the use of the polymeric composition as defined herein to reduce abrasion of a rope, a synthetic chain or a belt comprising such composition. In particular, the present invention provides a use of the polymeric composition as defined herein to reduce abrasion of a rope, a synthetic chain or a belt comprising such composition, wherein the rope, synthetic chain or belt comprises high performance polyethylene HPPE filaments having a tenacity of at least 0.6 N/tex.

In an aspect the present invention provides a use of the polymeric composition comprising:

a) the thermoplastic ethylene copolymer, wherein the thermoplastic ethylene copolymer is a copolymer of ethylene and wherein said polymeric composition has a peak melting temperature in the range from 40 to 140° C., measured in accordance with ASTM E794-06; and
b) the polysiloxane;

to reduce abrasion of a rope or belt comprising such polymeric composition compared to a rope or belt without, i.e. not comprising, such polymeric composition when measured under the same conditions, wherein the rope or belt comprises high performance polyethylene HPPE filaments having a tenacity of at least 0.6 N/tex.

In particular the present invention provides a use of the polymeric composition comprising:

a) a thermoplastic ethylene copolymer, wherein the thermoplastic ethylene copolymer is a copolymer of ethylene and wherein said polymeric composition has a peak melting temperature in the range from 40 to 140° C., measured in accordance with ASTM E794-06; and
b) a polysiloxane;

to reduce abrasion of a rope or belt comprising:

high performance polyethylene (HPPE) filaments having a tenacity of at least 0.6 N/tex; and
the polymeric composition;

compared to a rope or belt comprising the HPPE filaments and the thermoplastic copolymer and lacking the polysiloxane, when measured under the same conditions.

The present invention further relates to the use of the coating composition as defined herein for improving abrasion performance, in particular an improved external abrasion fatigue of a lengthy body according to the invention.

The present invention further relates to the use of the coating composition as defined herein for improving abrasion performance, in particular an improved external abrasion fatigue of a rope.

The present invention provides a use of the coating composition as defined herein to reduce abrasion of a rope, a synthetic chain or a belt comprising such composition, wherein the rope, synthetic chain or belt comprises high performance polyethylene HPPE filaments having a tenacity of at least 0.6 N/tex.

In an aspect the present invention provides a use of the coating composition comprising:

a) the thermoplastic ethylene copolymer, wherein the thermoplastic ethylene copolymer is a copolymer of ethylene and wherein said polymeric composition has a peak melting temperature in the range from 40 to 140° C., measured in accordance with ASTM E794-06; and
b) the polysiloxane;
c) and water;

to improve abrasion performance of a rope or a belt comprising:

high performance polyethylene (HPPE) filaments having a tenacity of at least 0.6 N/tex; and
the thermoplastic ethylene copolymer and the polysiloxane;

compared to a rope or a belt comprising the HPPE filaments and the thermoplastic copolymer and lacking the polysiloxane, when measured under the same conditions.

Abrasion may be measured as described herein. A typical method is the Fairlead abrasion performance test. For example the 10 mm rope fairlead abrasion performance test. Herein the terms "improve(d) abrasion resistance", "reduce (d) abrasion" and "improve(d) abrasion performance" are used interchangeably.

The present invention further relates to a method of lifting and/or placement of an object comprising the steps:

a) providing a rope, a chain or a belt according to the invention;
b) connecting the rope, the chain or the belt to the object to be lifted; and
c) using the rope, the chain or the belt to lift and/or place the object.

The method of lifting and/or placement according to the invention includes heavy lifting and mooring of objects onto a seabed. The method of lifting and/or placement according to the invention includes lifting and placement of objects, onto a ship, onto land or on land. Other applications include offshore oil and gas exploration, oceanographic, seismic and other industrial applications.

The invention will be further explained by the following embodiments and examples and comparative experiments.

Below also the methods used in determining the various parameters useful in defining the present invention are hereinafter presented.

The present invention includes without limitation the following embodiments. Features of any one embodiment may be combined with features of another embodiment. So for example features of a composite elongated body, may be combined with any features of lengthy body embodiments, method embodiments and/or use embodiments and vice versa.

EMBODIMENTS

1. A composite elongated body (3), comprising high performance polyethylene (HPPE) filaments (2) having a tenacity of at least 0.6 N/tex and a polymeric composition throughout (10) the composite elongated body, wherein the polymeric composition comprises:
   i. a thermoplastic ethylene copolymer and
   ii. a lubricant;
   and wherein the thermoplastic ethylene copolymer is a copolymer of ethylene and wherein said polymeric composition has a peak melting temperature in the range from 40 to 140° C. measured in accordance with ASTM E794-06, considering the second heating curve at a heating rate of 10 K/min, on a dry sample.
2. A composite elongated body (3), comprising
   a yarn (1), said yarn comprising at least two high performance polyethylene HPPE filaments (2) having a tenacity of at least 0.6 N/tex; and
   a polymeric composition (10) throughout the composite elongated body, wherein
   the polymeric composition comprises
   i. a thermoplastic ethylene copolymer and
   ii. a lubricant;
   and wherein the thermoplastic ethylene copolymer is a copolymer of ethylene and wherein said polymeric composition has a peak melting temperature in the range from 40 to 140° C.

3. A composite elongated body, according to any preceding embodiment, wherein said polymeric composition has a density as measured according to ISO1183-04 in the range from 860 to 970 kg/m$^3$.

4. A composite elongated body, according to any preceding embodiment, wherein said polymeric composition has a heat of fusion of at least 5 J/g.

5. The composite elongated body according to any preceding embodiment, wherein said polymeric composition has a peak melting temperature in the range from 50 to 120° C.

6. The composite elongated body according to any preceding embodiment, wherein the peak melting temperature is the melting temperature of highest melting peak.

7. The composite elongated body according to any preceding embodiment, wherein the thermoplastic ethylene copolymer comprises an ethylene-propylene co-polymer.

8. The composite elongated body according to any preceding embodiment, wherein the thermoplastic ethylene copolymer comprises an ethylene copolymer with co-monomers such as 1-butene, isobutylene.

9. The composite elongated body according to any preceding embodiment, wherein the thermoplastic ethylene copolymer comprises an ethylene copolymer with co-monomers which contain at least one hetero atom such as acrylic acid, methacrylic acid, vinyl acetate, maleic anhydride, ethyl acrylate, methyl acrylate.

10. The composite elongated body according to any preceding embodiment, wherein the thermoplastic ethylene copolymer comprises an α-olefin copolymer or a cyclic olefin copolymer, or a blend thereof.

11. The composite elongated body according to any preceding embodiment, wherein the thermoplastic ethylene copolymer comprises a copolymer of ethylene and contains as co-monomers one or more olefins having 2 to 12 C-atoms, preferably ethylene, propylene, isobutene, 1-butene, 1-hexene, 4-methyl-1-pentene, 1-octene, acrylic acid, methacrylic acid or vinyl acetate.

12. The composite elongated body according to any preceding embodiment, wherein the thermoplastic ethylene copolymer is an ethylene-propylene co-polymer.

13. The composite elongated body according to any preceding embodiment, wherein the thermoplastic ethylene copolymer is an ethylene copolymer with co-monomers such as 1-butene, isobutylene.

14. The composite elongated body according to any preceding embodiment, wherein the thermoplastic ethylene copolymer is an ethylene copolymer with co-monomers which contain at least one hetero atom such as acrylic acid, methacrylic acid, vinyl acetate, maleic anhydride, ethyl acrylate, methyl acrylate.

15. The composite elongated body according to any preceding embodiment, wherein the thermoplastic ethylene copolymer is an α-olefin copolymer or a cyclic olefin copolymer, or a blend thereof.

16. The composite elongated body according to any preceding embodiment, wherein the thermoplastic ethylene copolymer is a copolymer of ethylene and contains as co-monomers one or more olefins having 2 to 12 C-atoms, preferably ethylene, propylene, isobutene, 1-butene, 1-hexene, 4-methyl-1-pentene, 1-octene, acrylic acid, methacrylic acid or vinyl acetate.

17. The composite elongated body according to any preceding embodiment, wherein thermoplastic ethylene copolymer is made via copolymerization of ethylene with ethylenically unsaturated monomers.

18. The composite elongated body according to any preceding embodiment, wherein the ethylenically unsaturated monomer comprises oxygen and/or nitrogen atoms.

19. The composite elongated body according to any preceding embodiment, wherein the ethylenically unsaturated monomer comprises a carboxylic acid group or derivatives thereof resulting in an acylated polymer.

20. The composite elongated body according to any preceding embodiment, wherein the density of the thermoplastic ethylene copolymer is in the range from 860 to 970 kg/m$^3$ as measured according to ISO1183-04.

21. The composite elongated body according to any preceding embodiment, wherein the density of the thermoplastic ethylene copolymer is in the range from 870 to 930 kg/m$^3$ as measured according to ISO1183-04.

22. The composite elongated body according to any preceding embodiment, wherein the density of the thermoplastic ethylene copolymer is in the range from 870 to 920 kg/m$^3$ as measured according to ISO1183-04.

23. The composite elongated body according to any preceding embodiment, wherein the density of the thermoplastic ethylene copolymer is in the range from 875 to 910 kg/m$^3$ as measured according to ISO1183-04.

24. The composite elongated body according to any preceding embodiment, wherein the density of the thermoplastic ethylene copolymer is in the range from 875 to 900 kg/m$^3$ as measured according to ISO1183-04.

25. The composite elongated body according to any preceding embodiment, wherein the density of the polymeric composition is in the range from 870 to 930 kg/m$^3$ as measured according to ISO1183-04.

26. The composite elongated body according to any preceding embodiment, wherein the density of the polymeric composition is in the range from 870 to 920 kg/m$^3$ as measured according to ISO1183-04.

27. The composite elongated body according to any preceding embodiment, wherein the density of the polymeric composition is in the range from 875 to 910 kg/m$^3$ as measured according to ISO1183-04.

28. The composite elongated body according to any preceding embodiment, wherein the density of the polymeric composition is in the range from 875 to 900 kg/m$^3$ as measured according to ISO1183-04.

29. The composite elongated body according to any preceding embodiment, wherein the lubricant comprises a polysiloxane such as a polydimethylsiloxane (reactive or non-reactive); a fluorosilicone and other fluoropolymers like PTFE; a wax including a synthetic wax such as PE and PP wax, a silicone wax, an animal wax such as beeswax, a plant wax such as carnauba wax; a synthetic grease or oils; a mineral grease and oils; an inorganic solid such as graphite or molybdenum disulfide; a ceramic such as a ceramic lubricant or ceramic coating; a PUR; an acrylic; a hybrid of PUR and acrylic; or any combination thereof.

30. The composite elongated body according to any preceding embodiment, wherein the lubricant comprises a polysiloxane.

31. The composite elongated body according to any preceding embodiment, wherein the lubricant is a polysiloxane, preferably a polydimethylsiloxane.

32. The composite elongated body according to any preceding embodiment, wherein the a polysiloxane comprises a polydimethylsiloxane (reactive or non-reactive); a fluorosilicone, a silicone wax, or a combination thereof.

33. The composite elongated body according to any preceding embodiment, wherein the lubricant comprises a non-reactive polysiloxane or a reactive polysiloxane or wherein the lubricant comprises a combination of a non-reactive polysiloxane and a reactive polysiloxane.

34. The composite elongated body according to any preceding embodiment, wherein the polysiloxane is selected from the group consisting of polysilane, polysiloxane, preferably polydialkylsiloxane, more preferably polydimethylsiloxane.

35. The composite elongated body according to any preceding embodiment, wherein the polysiloxane comprises a siloxane wax.

36. The composite elongated body according to any preceding embodiment, wherein the polysiloxane comprises a polydimethylsiloxane.

37. The composite elongated body according to any preceding embodiment, wherein the polydimethylsiloxane is a non-reactive polydimethylsiloxane or a reactive polydimethyl siloxane, 38. The composite elongated body according to any preceding embodiment, wherein the polydimethylsiloxane is a non-reactive polydimethylsiloxane.

39. The composite elongated body according to any preceding embodiment, wherein the polysiloxane comprises a fluorosilicone.

40. The composite elongated body according to any preceding embodiment, wherein the polysiloxane is having a viscosity in the range from 10 to 100 Pa·s determined as described in the METHODS section herein.

41. The composite elongated body according to any preceding embodiment, wherein the polysiloxane is having a viscosity in the range from 12 Pa·s to 50 Pa·s determined as described in the METHODS section herein.

42. The composite elongated body according to any preceding embodiment, wherein the polysiloxane is a polysiloxane comprising a reactive group selected from the group consisting of Vinyl, Hydride, Silanol, Alkoxy/Polymeric Alkoxide, Epoxy, Carbinol, Methacrylate/Acrylate, Mercapto, Acetoxy/Chlorine/Dimethylamine, Polymeric Alkoxide, Silsesquioxanes, Polysilanes, Polysilazanes, Hydroxy, Amine, Acrylamide, Hexenyl, Fluor, and Isocyanate.

43. The composite elongated body according to any preceding embodiment, wherein the polysiloxane is a siloxane wax 44. The composite elongated body according to any preceding embodiment, wherein the lubricant is a silicon containing polymer.

45. The composite elongated body according to any preceding embodiment, wherein the silicon containing polymer is selected from the group consisting of polysilane, polysiloxane, preferably polydialkylsiloxane, more preferably polydimethylsiloxane.

46. The composite elongated body according to any preceding embodiment, wherein the polysiloxane is a polydimethylsiloxane.

47. The composite elongated body according to any preceding embodiment, wherein the polydimethylsiloxane is a non-reactive polydimethylsiloxane or a reactive polydimethyl siloxane, 48. The composite elongated body according to any preceding embodiment, wherein the polydimethylsiloxane is a non-reactive polydimethylsiloxane.

49. The composite elongated body according to any preceding embodiment, wherein the polysiloxane is a fluorosilicone.

50. The composite elongated body according to any preceding embodiment, wherein the composite elongated body comprises a) 60-95 mass % of high-performance polyethylene filaments;

b) 5.0-25 mass % of the thermoplastic ethylene copolymer having a peak melting temperature measured according to ASTM E794-06 of 40-140° C.;

c) 0.1-10 mass % of a polysiloxane; and d) 0-5.0 mass % of other additives;

wherein the sum of components a)-d) is 100 mass %.

51. The composite elongated body according to any preceding embodiment, wherein the composite elongated body comprises a) 75-92 mass % of high-performance polyethylene filaments;

b) 7.5-15 mass % of the thermoplastic ethylene copolymer having a peak melting temperature measured according to ASTM E794-06 of 40-140° C.;

c) 0.5-10 mass % of a polysiloxane; and d) 0-5.0 mass % of other additives;

wherein the sum of components a)-d) is 100 mass %.

52. The composite elongated body according to any preceding embodiment, wherein the composite elongated body comprises a) 80-92 mass % of high-performance polyethylene filaments;

b) 8-12 mass % of the thermoplastic ethylene copolymer having a peak melting temperature measured according to ASTM E794-06 of 40-140° C.;

c) 0.75-8 mass % of a polysiloxane; and d) 0-5.0 mass % of other additives;

wherein the sum of components a)-d) is 100 mass %.

53. The composite elongated body according to any preceding embodiment, wherein the composite elongated body comprises the polysiloxane in an amount in the range of from 0.5 mass % to 10 mass % based on total solids of the polymeric composition as measured using ICP-EAS.

54. The composite elongated body according to any preceding embodiment, wherein the composite elongated body comprises the polysiloxane in an amount in the range of from 0.75 mass % to 8 mass % based on total solids of the polymeric composition as measured using ICP-EAS, preferably in an amount in the range of from 1 mass % to 5 mass % based on total solids of the coating composition as measured using ICP-EAS.

55. The composite elongated body according to any preceding embodiment, wherein the peak melting temperature of the polymeric composition is in the range from 50 to 130° C., preferably wherein the peak melting temperature is in the range from 60 to 120° C.

56. The composite elongated body according to any preceding embodiment wherein the heat of fusion of the polymeric composition is at least 10 J/g.

57. The composite elongated body according to any preceding embodiment wherein the heat of fusion of the polymeric composition is at least 15 J/g, preferably the heat of fusion is at least 20 J/g.

58. The composite elongated body according to any preceding embodiment, preferably wherein the heat of fusion of the polymeric composition is at least 30 J/g, preferably at least 50 J/g.

59. The composite elongated body according to any preceding embodiment wherein the heat of fusion of the polymeric composition is at most 280 J/g, preferably at most 200 J/g.

60. The composite elongated body according to any preceding embodiment, wherein the thermoplastic ethylene copolymer is a semi-crystalline polyolefin having a peak melting temperature in the range from 40 to 140° C. and a heat of fusion of at least 5 J/g, measured in accordance with ASTM E794-06 and ASTM E793-85, respectively, considering the second heating curve at a heating rate of 10 K/min, on a dry sample.

61. The composite elongated body according to any preceding embodiment, wherein the molecular weight of the thermoplastic ethylene copolymer is 6000 Dalton or more, preferably 8000 Dalton or more, as measured using SEC-MALS.

62. The composite elongated body according to any preceding embodiment, wherein the composite elongated body comprises a) 75-92 mass % of high-performance polyethylene filaments;

b) 8-25 mass % of the polymeric composition; and c) 0-5.0 mass % of other additives;

wherein the sum of components a)-c) is 100 mass %.

63. The composite elongated body according to any preceding embodiment, wherein the composite elongated body comprises a) 80-90 mass % of high-performance polyethylene filaments;

b) 12-20 mass % of the polymeric composition; and c) 0-5.0 mass % of other additives;

wherein the sum of components a)-c) is 100 mass %.

64. The composite elongated body according to any preceding embodiment, wherein the composite elongated body comprises an amount of polymeric composition in the range of from 5 mass % to 50 mass % matrix based on the total weight of the composite elongated body.

65. The composite elongated body according to any preceding embodiment, wherein the composite elongated body comprises an amount of polymeric composition in the range of from 8 mass % to 25 mass % based on the total weight of the composite elongated body, preferably the composite elongated body comprises an amount of polymeric composition in the range of from 12 mass % to 20 mass % based on the total weight of the composite elongated body.

66. The composite elongated body according to any preceding embodiment, wherein the composite elongated body comprises at least two filaments.

67. The composite elongated body according to any preceding embodiment, wherein the composite elongated body comprises at least at least 20 filaments.

68. The composite elongated body according to any preceding embodiment, wherein the composite elongated body comprises at least at least 100 filaments, preferably the composite elongated body comprises at least 200 filaments.

69. The composite elongated body according to any preceding embodiment, wherein the composite elongated body comprises at least 400 filaments, preferably the composite elongated body comprises at least 800 filaments.

70. The composite elongated body according to any preceding embodiment, wherein the composite elongated body comprises at most 1500 filaments, preferably at most 1200 filaments, more preferably at most 5000 filaments.

71. The composite elongated body according to any preceding embodiment, wherein the yarn comprises at least two HPPE filaments.

72. The composite elongated body according to any preceding embodiment, wherein the yarn comprises at least at least 20 filaments.

73. The composite elongated body according to any preceding embodiment, wherein the yarn comprises at least at least 100 filaments, preferably the yarn comprises at least 200 filaments.

74. The composite elongated body according to any preceding embodiment, wherein the yarn comprises at least 400 filaments, preferably the composite elongated body comprises at least 800 filaments.

75. The composite elongated body according to any preceding embodiment, wherein the yarn comprises at most 1500 filaments, preferably at most 1200 filaments, more preferably at most 5000 filaments.

76. The composite elongated body according to any preceding embodiment, wherein the tenacity of the HPPE filaments is at least 1.0 N/tex.

77. The composite elongated body according to any preceding embodiment, wherein the tenacity of the HPPE filaments is at least 1.5 N/tex, preferably at least 1.8 N/tex.

78. The composite elongated body according to any preceding embodiment, wherein the tenacity of the HPPE filaments is at least 2.0 N/tex, preferably at least 3.0 N/tex.

79. The composite elongated body according to any preceding embodiment, wherein the tenacity of the HPPE filaments is at least 3.5 N/tex, preferably at least 4.0 N/tex.

80. The composite elongated body according to any preceding embodiment, wherein the tenacity of the HPPE filaments is at most 7.0 N/tex, preferably at most 6.0 N/tex.

81. The composite elongated body according to any preceding embodiment, wherein the tenacity of the HPPE filaments is at least 2.8 N/tex, preferably at least 3.2 N/tex and more preferably at least 3.5 N/tex.

82. The composite elongated body according to any preceding embodiment, wherein the tenacity of the HPPE filaments is at most 6.0 N/tex, preferably at most 5.5 N/tex and more preferably at most 5.0 N/tex.

83. The composite elongated body according to any preceding embodiment, wherein the tenacity of the HPPE filaments is at least 28 cN/dtex, preferably at least 32 cN/dtex and more preferably at least 35 cN/dtex.

84. The composite elongated body according to any preceding embodiment, wherein the tenacity of the HPPE filaments is at most 70 cN/dtex, preferably at most 50 cN/dtex 85. The composite elongated body according to any preceding embodiment, wherein the HPPE filaments comprise ultrahigh molecular weight (UHMWPE).

86. The composite elongated body according to any preceding embodiment, wherein the HPPE filaments are ultrahigh molecular weight (UHMWPE) filaments.

87. The composite elongated body according to any preceding embodiment, wherein the UHMWPE has an IV between 4 and 40 dL/g, preferably between 6 and 30 dL/g and most preferably between 8 and 25 dL/g.

88. The composite elongated body according to any preceding embodiment, wherein the UHMWPE has an intrinsic viscosity (IV) of at least 4 dL/g and comprises at least 0.3 short chain branches (SCB) per thousand total carbon atoms.

89. The composite elongated body according to any preceding embodiment, wherein the short chain branches (SCB) originate from a co-monomer in the UHMWPE wherein the co-monomer is selected from the group consisting of alpha-olefins with at least 3 carbon atoms, cyclic olefins having 5 to 20 carbon atoms and linear, branched or cyclic dienes having 4 to 20 carbon atoms.

90. The composite elongated body according to any preceding embodiment, wherein the SCB are $C_1$-$C_{20}$-hydrocarbyl groups, preferably the $C_1$-$C_{20}$-hydrocarbyl group is selected from the group consisting of methyl, ethyl, propyl, butyl, pentyl, hexyl, octyl and cyclohexyl, isomers thereof and mixtures thereof.

91. The composite elongated body according to any preceding embodiment, wherein the composite elongated body comprises at least 70 mass % UHMWPE, based on the total weight of the composite elongated body.

92. The composite elongated body according to any preceding embodiment, wherein the composite elongated body comprises at least 75 mass % of UHMWPE, based on the total weight of the composite elongated body, preferably at least 80 mass % of UHMWPE, based on the total weight of the composite elongated body.

93. The composite elongated body according to any preceding embodiment, wherein the composite elongated body comprises at least 85 mass % of UHMWPE, based on the total weight of the composite elongated body, preferably at least 90 mass % of UHMWPE, based on the total weight of the composite elongated body.

94. The composite elongated body according to any preceding embodiment, wherein a minimum creep rate of a multifilament HPPE yarn, comprising the high performance polyethylene HPPE filaments of at least 0.6 N/tex, determined as described in the METHOD section is at most $1\times10^{-5}$% per second as measured at a tension of 900 MPa and a temperature of 30° C.

95. The composite elongated body according to any preceding embodiment, wherein the minimum creep rate is at most $4\times10^{-6}$% per second, preferably at most $2\times10^{-6}$% per second, measured at a tension of 900 MPa and a temperature of 30° C.

96. The composite elongated body according to any preceding embodiment, wherein the minimum creep rate is at least about $1\times10^{-10}$% per second as measured at a tension of 900 MPa and a temperature of 30° C.

97. The composite elongated body according to any preceding embodiment, wherein the polymeric composition covers at least 50% of the total surface of the HPPE filaments of the composite elongated body, preferably by making an electron microscopy, such as a SEM (Scanning Electron Microscopy), analysis of the surface and/or of a cross section of the composite elongated body.

98. The composite elongated body according to any preceding embodiment, wherein the polymeric composition covers at least 70% of the total surface of the HPPE filaments of the composite elongated body.

99. The composite elongated body according to any preceding embodiment, wherein the polymeric composition covers at least 80% of the total surface of the HPPE filaments of the composite elongated body, preferably at least 90% of the total surface of the HPPE filaments of the composite elongated body.

100. The composite elongated body according to any preceding embodiment wherein the elongated body has a length dimension (Ld) which is much greater than a transverse dimension (Td) of width and of thickness.

101. The composite elongated body according to any preceding embodiment wherein the length dimension is at least 10 times, more preferably at least 20 times even more preferably at least 50 times and most preferably at least 500 times greater than the width or thickness dimension of the composite elongated body, whichever is larger.

102. The composite elongated body according to any preceding embodiment wherein the composite elongated body has cross section having a rectangular shape, an oval shape, a circular shape, a hexagonal or an octagonal shape.

103. A lengthy body comprising the composite elongated body according to any preceding embodiments.

104. The lengthy body according to any preceding embodiment wherein the lengthy body is selected from a strand, a cable, a cord, a rope, a belt, a strip, a hose and a tube.

105. A rope comprising at least three composite elongated bodies according to any preceding embodiment.

106. The rope according to any preceding embodiment demonstrating an improved bending performance as compared with a reference rope, preferably wherein the reference rope is a rope without the polymeric composition as defined in any preceding embodiment.

107. The rope according to any preceding embodiment demonstrating an improved bending performance as compared with a reference rope wherein the reference rope is a rope comprising a thermoplastic ethylene copolymer as defined in any preceding embodiment and lacking the lubricant as defined in any preceding embodiment.

108. A belt comprising at least three composite elongated bodies according to any preceding embodiment.

109. The belt according to any preceding embodiment demonstrating an improved bending performance as compared with a reference belt, preferably wherein the reference belt is a belt without the polymeric composition as defined in any preceding embodiment.

110. The belt according to any preceding embodiment demonstrating an improved bending performance as compared with a reference belt wherein the reference belt is a belt comprising a thermoplastic ethylene copolymer as defined in any preceding embodiment and lacking the lubricant as defined in any preceding embodiment.

111. An article comprising at least one lengthy body according to any preceding embodiment.

112. An article comprising at least one composite elongated body according to any preceding embodiment.

113. The article according to any preceding embodiment wherein the article is a net, for example a fishing net or an aquaculture net (typically to grow fish); a sling; a synthetic chain link; a synthetic chain or a tendon.

114. The article according to any preceding embodiment wherein the article is a personal protection item (such as a helmet or a body panel) or a knitted glove comprising at least one composite elongated body as described herein.

115. A lift system or crane comprising a sheave and the lengthy body according to any preceding embodiment.

116. A lift system or crane comprising a winch and the lengthy body according to any preceding embodiment.

117. A lift system or crane comprising a sheave and the belt according to any preceding embodiment.

118. A lift system or crane comprising a winch and the belt according to any preceding embodiment.

119. A lift system or crane comprising a sheave and the rope according to any preceding embodiment.

120. A lift system or crane comprising a winch and the rope according to any preceding embodiment.

121. A method of manufacturing a composite elongated body comprising the steps:

a) providing a coating composition, wherein the composition comprises
   i. a thermoplastic ethylene copolymer as defined in any preceding embodiment; and
   ii. a lubricant as defined in any preceding embodiment;
b) providing a yarn comprising at least two HPPE filaments as defined in any preceding embodiments;
c) applying the coating composition to the yarn to obtain a coated yarn; and d) exposing the coated yarn to elevated temperature obtain the composite elongated body;

wherein the high molecular weight thermoplastic ethylene copolymer is a copolymer of ethylene and wherein said thermoplastic ethylene copolymer has a peak melting temperature in the range from 40 to 140° C.

122. The method of manufacturing a composite elongated body according to any preceding embodiment wherein in step d) the coating composition is dried and the thermoplastic ethylene copolymer melts.

123. The method of manufacturing a composite elongated body according to any preceding embodiment, wherein the temperature in step d) is in the range from the melting temperature of the thermoplastic ethylene copolymer to 153° C. to at least partially melt the thermoplastic ethylene copolymer.

124. The method of manufacturing a composite elongated body according to any preceding embodiment, wherein upon completion of steps a), b), c) and d) the polymeric composition is present throughout the composite elongated body.

125. The method of manufacturing a composite elongated body according to any preceding embodiment, wherein upon completion of steps a), b), c) and d) the thermoplastic ethylene copolymer and the lubricant are present throughout the composite elongated body.

126. The method of manufacturing a composite elongated body according to any preceding embodiment, wherein the process comprises an additional step: e) shaping the composite elongated body by transporting it at the end of the oven through a die having a shape, to obtain the composite elongated body having a cross-sectional shape corresponding to the shape of the die.

127. The method of manufacturing a composite elongated body according to any preceding embodiment, wherein the method comprises a drying step before step d) and wherein the drying conditions in this step include temperatures of from 40 to 130° C., preferably from 50 to 120° C.

128. The method of manufacturing a composite elongated body according to any preceding embodiment, wherein the temperature in step d) is at least 2° C. above the peak melting temperature of the thermoplastic ethylene copolymer.

129. The method of manufacturing a composite elongated body according to any preceding embodiment, wherein the temperature in step d) is at least 5° C. above the peak melting temperature of the thermoplastic ethylene copolymer.

130. The method of manufacturing a composite elongated body according to any preceding embodiment, wherein the temperature in step d) is at most 150° C.

131. The method of manufacturing a composite elongated body according to any preceding embodiment wherein the temperature in step d) is at least 5° C. above the peak melting temperature of the thermoplastic ethylene copolymer and at most 145° C.

132. The method of manufacturing a composite elongated body according to any preceding embodiment wherein the temperature in step d) is at least 10° C. above the peak melting temperature of the thermoplastic ethylene copolymer and at most 140° C.

133. The method of manufacturing a composite elongated body according to any preceding embodiment, wherein step d) is combined with the drying step.

134. The method of manufacturing a composite elongated body according to any preceding embodiment, wherein in step d) a temperature gradient is applied to the coated yarn whereby the temperature is raised from about room temperature to the maximum temperature this step.

135. The method of manufacturing a composite elongated body according to any preceding embodiment, wherein in step d) the yarn is kept in an oven for from 2 to 100 seconds, preferably from 3 to 60 seconds, more preferably from 4 to 30 seconds.

136. The method of manufacturing a composite elongated body according to any preceding embodiment, wherein in step d) the coated yarn undergoes a continuous process from drying of the coating composition to at least partial melting of the thermoplastic ethylene copolymer.

137. The method of manufacturing a composite elongated body according to any preceding embodiment, wherein the HPPE filaments are prepared by a melt spinning process or a gel spinning process.

138. The method of manufacturing a composite elongated body according to any preceding embodiment, wherein the concentration of thermoplastic ethylene copolymer in the coating composition is between 5 and 50 mass %, whereby the weight percentage is the weight of thermoplastic ethylene copolymer in the total weight of the coating composition, preferably concentration of thermoplastic ethylene copolymer in the coating composition is between 6 and 40 mass %, whereby the weight percentage is the weight of thermoplastic ethylene copolymer in the total weight of the coating composition.

139. The method of manufacturing a composite elongated body according to any preceding embodiment, wherein the high performance polyethylene (HPPE) filaments have a tenacity of at least 1.0 N/tex.

140. The method of manufacturing a composite elongated body according to any preceding embodiment, wherein the HPPE filaments have a tenacity of 1.5 N/tex, preferably have a tenacity of at least 1.8 N/tex, preferably at least 2.5 N/tex and more preferably at least 3.5 N/tex.

141. The method of manufacturing a composite elongated body according to any preceding embodiment, wherein the amount of thermoplastic ethylene copolymer in the composite elongated body is from 1 to 25 mass %, whereby the weight percentage is the weight of thermoplastic ethylene copolymer in the total weight of the composite elongated body.

142. The method of manufacturing a composite elongated body according to any preceding embodiment, wherein the amount of thermoplastic ethylene copolymer in the composite elongated body is from 2 to 20 mass %, preferably from 4 to 18 mass %, whereby the weight percentage is the weight of thermoplastic ethylene copolymer in the total weight of the composite elongated body.

143. The method of manufacturing a composite elongated body according to any preceding embodiment wherein the density of the thermoplastic ethylene copolymer is in the range from 870 to 930 kg/m$^3$.

144. The method of manufacturing a composite elongated body according to any preceding embodiment wherein the density of the thermoplastic ethylene copolymer is in the range from 875 to 900 kg/m$^3$.

145. The method of manufacturing a composite elongated body according to any preceding embodiment wherein the thermoplastic ethylene copolymer has a heat of fusion of at least 5 J/g.

146. The method of manufacturing a composite elongated body according to any preceding embodiment wherein the peak melting temperature of the thermoplastic ethylene copolymer is in the range from 50 to 130° C., preferably in the range from 60 to 120° C.

147. The method of manufacturing a composite elongated body according to any preceding embodiment the peak melting temperature is the melting temperature of highest melting peak.

148. The method of manufacturing a composite elongated body according to any preceding embodiment wherein the heat of fusion of the thermoplastic ethylene copolymer is at least 10 J/g.

149. The method of manufacturing a composite elongated body according to any preceding embodiment wherein the heat of fusion of the thermoplastic ethylene copolymer is at least 15 J/g, preferably the heat of fusion is at least 20 J/g.

150. The method of manufacturing a composite elongated body according to any preceding embodiment wherein the heat of fusion of the thermoplastic ethylene copolymer is at most 280 J/g, preferably at most 200 J/g.

151. The method of manufacturing a composite elongated body according to any preceding embodiment wherein the lubricant comprises a polysiloxane.

152. The method of manufacturing a composite elongated body according to any preceding embodiment wherein the a polysiloxane comprises a polydimethylsiloxane (reactive or non-reactive); a fluorosilicone, a silicone wax, or a combination thereof.

153. The method of manufacturing a composite elongated body according to any preceding embodiment wherein the lubricant comprises a non-reactive polysiloxane or a reactive polysiloxane or wherein the lubricant comprises a combination of a non-reactive polysiloxane and a reactive polysiloxane.

154. The method of manufacturing a composite elongated body according to any preceding embodiment wherein the polysiloxane is selected from the group consisting of polysilane, polysiloxane, preferably polydialkylsiloxane, more preferably polydimethylsiloxane.

155. The method of manufacturing a composite elongated body according to any preceding embodiment wherein the coating composition is applied to the filaments by spraying, dipping, brushing or transfer rolling.

156. The method of manufacturing a composite elongated body according to any preceding embodiment, wherein the coating composition is an aqueous composition comprising at least 40 mass % water, 157. The method of manufacturing a composite elongated body according to any preceding embodiment, wherein the coating composition is an aqueous composition comprising at least 50 mass %, preferably at least 60 mass % water.

158. The method of manufacturing a composite elongated body according to any preceding embodiment, wherein the coating composition is an aqueous composition comprising at least 70 mass %, preferably at least 80 mass %, most preferably at least 90 mass % water.

159. The method of manufacturing a composite elongated body according to any preceding embodiment, wherein the coating composition is an aqueous composition comprising a) 40-95 mass % water;

b) 7.5-25 mass % of the thermoplastic ethylene copolymer as defined herein having a peak melting temperature measured according to ASTM E794-06 of 40-140° C.;

c) 0.5-10 mass % of a polysiloxane as defined herein; and d) 0-5.0 mass % of other additives;

wherein the sum of components a)-d) is 100 mass %.

160. The method of manufacturing a composite elongated body according to any preceding embodiment, wherein the coating composition is an aqueous composition comprising a) 40-95 mass % water;

b) 10-20 mass % of the thermoplastic ethylene copolymer as defined herein having a peak melting temperature measured according to ASTM E794-06 of 40-140° C.;

c) 0.5-8 mass % of a polysiloxane as defined herein; and d) 0-5.0 mass % of other additives;

wherein the sum of components a)-d) is 100 mass %.

161. The method of manufacturing a composite elongated body according to any preceding embodiment wherein the coating composition is an aqueous suspension or aqueous dispersion.

162. A composite elongated body obtainable by the method according to any of the preceding embodiments comprising HPPE filaments as defined in any of the preceding embodiments, and a polymeric composition as defined in any preceding embodiment throughout the composite elongated body.

163. A method of manufacturing a lengthy body comprising the step of assembling at least two composite elongated bodies according to any preceding embodiment to form the lengthy body.

164. The method of manufacturing a lengthy body according to any preceding embodiment, wherein the lengthy body is a strand, a cable, a cord, a rope, a belt, a strip, a hose or a tube.

165. A method of manufacturing an article comprising the step of providing the lengthy body according to any preceding embodiment and generating the article.

166. A method of manufacturing an article comprising the step of providing the composite elongated body according to any preceding embodiment and generating the article.

167. The method of manufacturing an article according to any preceding embodiment, wherein the article is a net, for example a fishing net or an aquaculture net (typically to grow fish); a round sling; a synthetic chain link; a synthetic chain; or a tendon.

168. The method of manufacturing an article according to any preceding embodiment, wherein the article is a personal protection item (such as a helmet or a body panel) or a glove.

169. A method of lifting and/or placement of an object comprising the steps a) providing a rope according to any preceding embodiment;

b) connecting the rope to the object to be lifted; and c) using the rope to lift and/or place the object.

170. A method of lifting and/or placement of an object comprising the steps a) providing a sling according to any preceding embodiment;

b) connecting the sling to the object to be lifted; and c) using the sling to lift and/or place the object.

171. A method of lifting and/or placement of an object comprising the steps a) providing a chain according to any preceding embodiment;

b) connecting the chain to the object to be lifted; and c) using the chain to lift and/or place the object.

172. Use of the coating composition as defined in any one of the preceding embodiments to improve bending performance of a rope or belt.

173. Use of the polymeric composition as defined in any one of the preceding embodiments to improve bending performance of a rope or belt compared to a rope or belt without such polymeric composition.

174. Use of the coating composition as defined in any one of the preceding embodiments to improve fairlead abrasion of a rope or belt.

175. Use of the coating composition as defined in any one of the preceding embodiments to improve abrasion performance of a rope or belt.

176. Use of the polymeric composition as defined in any one of the preceding embodiments to reduce abrasion of a rope or belt compared to a rope or belt without such polymeric composition.

FIGURE DESCRIPTION

FIG. 1*a* schematically depicts a cross section of a yarn (1) comprising high performance polyethylene HPPE filaments (2) having a tenacity of at least 0.6 N/tex.

FIG. 1*b* schematically depicts a yarn (1) comprising high performance polyethylene HPPE filaments (2) having a tenacity of at least 0.6 N/tex having a length dimension (Ld) which is much greater than a transverse dimension (Td) of width and of thickness.

FIG. 1*c* schematically depicts a cross section of a composite elongated body according to the invention comprising high performance polyethylene HPPE filaments (2) having a tenacity of at least 0.6 N/tex and a polymeric composition throughout (10) the composite elongated body. The polymeric composition (10) is present throughout the composite elongated body. The composite elongated body comprises said polymeric composition, more specifically the polymeric composition is present in between the filaments of the composite elongated body.

The polymeric composition is present throughout the cross-section of the composite elongated body and in intimate contact with the at least one filament, i.e. with the individual filaments. In an even more preferred embodiment the polymeric composition impregnates the filaments; in other words: the polymeric composition is present throughout the cross-section of the composite elongated body. Hereby is understood that the polymeric composition is present in between substantially all the filaments of the composite elongated body. Preferably at least 50% of the surface of the filaments of the composite elongated body in contact with the polymeric composition, more preferably at least 70% and most preferably 90% of the filament surface is in contact with the polymeric composition. A way to look at this may be via a microscopic image of a cross section of the composite elongated body and see which % of the filament surface is in contact with the polymeric composition.

FIG. 2 schematically depicts a Cyclic bend-over-sheave (CBOS) test set-up for a 5 mm rope. Details are given below in the METHODS. FIG. 2B depicts a schematic "see through" of the inside of the schematic frame (24) in FIG. 2A. F represents the direction of the Tension (MPa).

FIG. 3 schematically depicts a Cyclic bend-over-sheave (CBOS) test set-up for a 21 mm rope. Details are given below in the METHODS.

FIG. 4 schematically depicts a fairlead abrasion test set-up. Details are given below in the METHODS.

FIG. 5 schematically depicts a cross section of a composite elongated body (53) according to the invention comprising high performance polyethylene HPPE filaments (52) having a tenacity of at least 0.6 N/tex and a polymeric composition throughout (50) the composite elongated body. In an embodiment the composite elongated body may have cross section having a rectangular shape (54), an oval shape (52), a circular shape (55), a hexagonal (56) or an octagonal shape.

FIG. 6 schematically depicts an embodiments of a chain according to the invention. The chain (60) comprises at least two interconnected chain links (61). The chain link comprises a strip (62). The strip is typically a narrow webbing comprising at least at least two composite elongated bodies (not shown in detail). The strip of material in this embodiment forms a plurality of convolutions of said strip, the strip having a longitudinal axis and each convolution of said strip comprising a twist along the longitudinal axis of said strip, said twist being an odd multiple of 180 degrees. Such a chain link is described in the published patent application WO2013186206, incorporated herein by reference. By a "convolution" of the strip is herein understood a loop thereof, also called a winding or a coiling, i.e. a length of said strip starting at an arbitrary plane perpendicular to the longitudinal axis of the strip and ending in an endless fashion at the same plane, thereby defining a loop of said strip. The term "plurality of convolutions" may also be understood herein as "coiled into a plurality of overlapping layers". Said overlapping layers of the strip are preferably substantially superimposed upon one another but may also present a lateral offset. The convolutions may be in direct contact to each other but may also be separated. Separation between the convolutions may for example be by a further strip of material, an adhesive layer or a coating. Preferably, the chain link in the chain according to the present invention comprises at least 2 convolutions of the strip of material, preferably at least 3, more preferably at least 4, most preferably at least 8 convolutions. The maximum number of convolutions is not specifically limited. For practical reasons 1000 convolutions may be considered as an upper limit. Each convolution of the strip of material may comprise a twist of an odd multiple of 180 degrees along its longitudinal axis; preferably the odd multiple is one. Said twist of an odd multiple of 180 degrees will result in a chain link comprising a twist of an odd multiple of 180 degrees along its longitudinal axis. The presence of said twist in each convolution of the strip of material results in a chain link with a single outer surface. Another characteristic of said construction may be that the lateral surfaces of a first end of the strip of material are superimposed on either side by the convoluted strip of material. It was observed that said twist results in a construction such that the convolutions lock themselves against relative shifting. Preferably, at least 2 convolutions of the strip of material are connected to each other by at least one fastening means.

FIG. 7 schematically depicts an embodiment of a chain according to the invention. The chain (70) comprises at least two interconnected chain links (71). The chain links comprise at least at least two composite elongated bodies (not shown in detail).

FIG. 8*a* represents an example of a knotless warp-knitted net (Raschel Knotless net) (80), comprising cords (81), each cord comprises a single composite elongated body (81), the cords form mesh legs (indicated with ovals 85) and joints. The joints are formed from intermingled cords (indicated within ovals 82 and 83: two mesh legs are formed into a joint). The mesh size (length) is indicated by arrow (84). In another embodiment the cord comprises at least two composite elongated bodies, typically 2 to 3 composite elongated bodies.

FIG. 8*b* shows schematically that mesh size (84) of a knotless net is measured as the length between the 2 opposite joints of a stretched mesh.

FIG. 9 schematically depicts a rope (90) according to the invention comprising laid strands (91), the strands comprise at least three composite elongated bodies (not shown in detail) according to the invention. The outer surface of the rope is indicated with 92.

FIG. 10 schematically depicts a rope (100) according to the invention comprising twelve braided strands (101), the strands comprise the composite elongated body (not shown in detail) according to the invention. The outer surface of the rope is indicated with 102.

METHODS

Figure 1C:
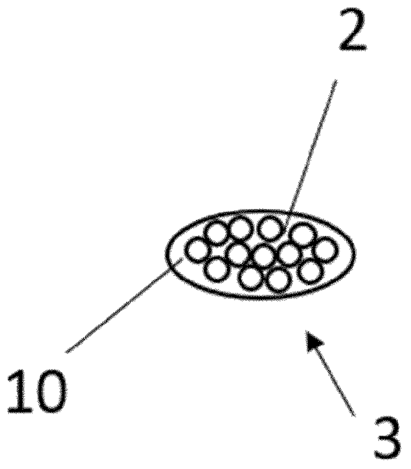

Titer was measured by weighing an arbitrary length of yarn or filament, respectively. The titer of the yarn or filament was calculated by dividing the weight by the length and is reported in either tex or dtex expressing the weight in gram per 100,000 m or 10,000 m respectively. The length of yarn or filament measured is typically 50 meters.

Heat of fusion and peak melting temperature have been measured according to standard DSC methods ASTM E 793-85 and ASTM E 794-06, respectively, at a heating rate of 10 K/min for the second heating curve and performed under nitrogen on a dehydrated sample. In such DSC measurement a part of the full composite elongated composition (including HPPE filaments) can be measured. The peaks from HPPE and coating are sufficiently well separated so the Tm and heat of fusion of coating can be determined directly.

Coating percentage The amount of polymeric composition in the composite elongated body according to the invention (coating percentage) may be determined as follows.

A sample of 1.0 gram of composite elongated body is taken. The polymeric composition in the sample is extracted from the composite elongated body via a warm Soxhlet extraction: refluxing with toluene containing 5% acetic acid (150 ml), for 16 hours. After extraction the remainder of the sample is dried for 2.5 hours at 80° C. in vacuum. By weighing the sample before and after the extraction process, the coating percentage can be calculated using the following formula:

$$\text{Coating percentage} = (1 - (\text{M\_after\_extraction}/\text{M\_before\_extraction}) * 100\%$$

In which M_after_extraction is the mass of the sample after extraction and drying as described above and M_before_extraction is the mass of the sample before extraction and drying as described above. And *100% means: x (multiplication) 100%

Density The density of the polymeric composition is measured according to ISO 1183-04. The density of the thermoplastic ethylene copolymer is measured according to ISO 1183-04.

Immersion method (A) and more preferably density gradient column method (B) are suitable for the present products. It is noted that ISO 1183-1:2004 covers three methods, and that the skilled person will be able to select, depending on the sample to be tested, suitable sample preparation technique and method. The skilled person would know that if he/she is faced with a finished product, he/she needs to obtain the polymeric composition before doing the density measurement. It is part of the skills of the skilled person to, depending on what the finished product looks like, determine how to obtain and prepare a sample of the polymeric composition and thereafter based on what the sample looks like select the appropriate way to measure the density. For example the polymeric composition may be scraped off from the composite elongated body and measured. Depending on what the scraped off product looks like, any of the corresponding methods listed in the ISO 1183-2004 may be used.

It is noted that the density of the thermoplastic ethylene copolymer will typically be provided by the supplier will provide this information e.g. in the specification of the product.

Viscosity: the viscosity of a polysiloxane, was determined as follows.

Sample preparation of polysiloxane emulsion, by example of Wacker® ölemulsion C 800:

An aluminum dish (diameter ca 8 cm) was filled with ca. 15-20 gram of Wacker® ölemulsion C 800. Water was evaporated from Wacker® ölemulsion C 800 sample overnight in a fume hood. The aluminum dish with sample transferred to oven and remainder of water evaporated at room temperature at ~200 mbar nitrogen atmosphere. The sample was regularly checked for weight loss. The process is stopped when no more the weight loss was detected. The sample consisted of two distinct phases and in order to ease the process of separating them the sample was transferred to a glass reaction tube. The upper layer was determined (using FT-IR see below) to be the 'silicon' phase.

Vicosity Measurement (Polysiloxane):

The viscosity measurement was performed on the Anton Paar Physica MCR501 rheometer equipped with a P-PTD200+H-PTD200 temperature control device and 50 mm parallel plate measuring system. Measuring gap was set to 0.90 mm. The measurements were performed on sample material from the isolated upper 'silicon phase' (A quick check with FT-IR was performed on a sample of the isolated 'silicon' phase in order to verify that the isolated phase that was used to perform the viscosity measurements was indeed the 'silicon' phase (polydimethylsiloxane), this was indeed the case: FT-IR result shows a match of the 'silicon phase' (oil fraction) spectrum with a spectrum of polydimethylsiloxane from the data library. No clear sign of presence of water and or polyglycolether in the measured sample ('silicon phase); Water, if present, would show as a broad peak between 3200-3500 $cm^{-1}$)

Dynamic frequency sweep @ 20° C. from 100 to 0.01 rad/s and 5% strain. Steady shear rate ramp (up) from 0.01 to 100 $s^{-1}$ followed by a steady shear rate ramp (down) from 100 to 0.01 $s^{-1}$ @ 20° C.

IV: the Intrinsic Viscosity is determined according to method ASTM D1601(2004) at 135° C. in decalin, the dissolution time being 16 hours, with BHT (Butylated Hydroxy Toluene) as anti-oxidant in an amount of 2 g/l solution, by extrapolating the viscosity as measured at different concentrations to zero concentration.

Tensile properties of HPPE filaments: filament tenacity and filament tensile modulus:

Determination of filament linear density and mechanical properties is carried out on a semiautomatic, microprocessor controlled tensile tester (Favimat, tester no. 37074, from Textechno Herbert Stein GmbH & Co. KG, Mönchengladbach, Germany) which works according to the principle of constant rate of extension (DIN 51 221, DIN 53 816, ISO 5079) with integrated measuring head for linear density measurement according to the vibroscopic testing principle using constant tensile force and gauge length and variable exciting frequency (ASTM D 1577). The Favimat tester is equipped with a 1200 cN balance, no. 14408989. The version number of the Favimat software: 3.2.0.

Figure 12:
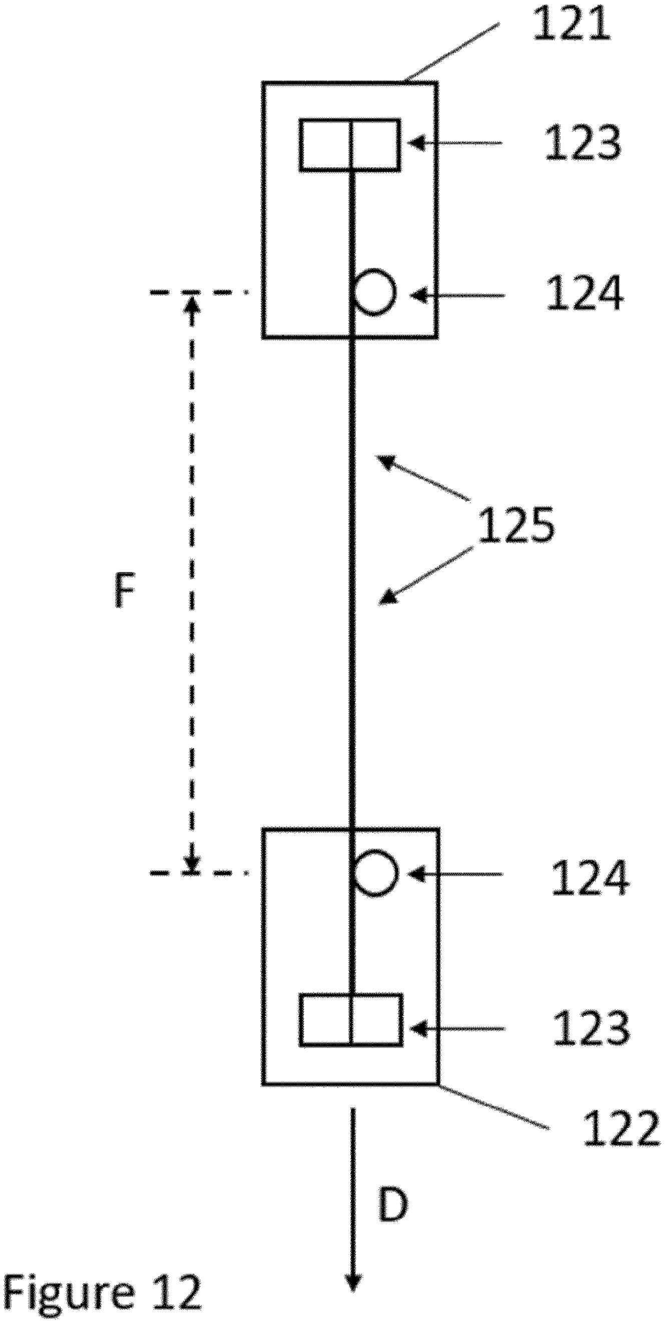
FIG. 12 is described in the METHODS under Tensile properties of HPPE filaments.

Clamp slippage during filament tensile testing, preventing filament fracture, is eliminated by adaption of the Favimat clamps of the Favimat according to FIG. 12.

The upper clamp 121 is attached to the load cell (not shown). The lower clamp 122 moves in downward direction (D) with selected tensile testing speed during the tensile test. The filament (125) to be tested, at each of the two clamps, is clamped between two jaw faces 123 (4×4×2 mm) made from Plexiglass® and wrapped three times over ceramic pins 124. Prior to tensile testing, the linear density of the filament length between the ceramic pins is determined vibroscopically. Determination of filament linear density is carried out at a filament gauge length (F) of 50 mm (see FIG. 12), at a pretension of 2.50 cN/tex (using the expected filament linear density calculated from yarn linear density and number of filaments). Subsequently, the tensile test is performed at a test speed of the lower clamp of 25 mm/min with a pretension of 0.50 cN/tex, and the filament tenacity is calculated from the measured force at break and the vibroscopically determined filament linear density. The elongational strain is determined by using the whole filament length between the upper and lower plexiglass jaw faces at the defined pretension of 0.50 cN/tex. The beginning of the stress-strain curve shows generally some slackness and therefore the modulus is calculated as a chord modulus between two stress levels. The Chord Modulus between e.g. 10 and 15 cN/dtex is given by equation (1):

$$\text{Chord Modulus between 10 and 15 } cN/dtex = CM(10{:}15) = \frac{50}{\varepsilon_{15} - \varepsilon_{10}}(N/tex) \quad (1)$$

where:

$\varepsilon_{10}$=elongational strain at a stress of 10 cN/dtex (%); and $\varepsilon_{15}$=elongational strain at a stress of 15 cN/dtex (%).

The measured elongation at break is corrected for slackness as given by equation (2):

$$EAB = EAB(\text{measured}) - \left(\varepsilon_5 - \frac{50}{CM(5{:}10)}\right) \quad (2)$$

where:

EAB=the corrected elongation at break (%)

EAB (measured)=the measured elongation at break (%)

$\varepsilon_5$=elongational strain at a stress of 5 cN/dtex (%)

CM(5:10)=Chord Modulus between 5 and 10 cN/dtex (N/tex).

Tensile properties of HPPE yarns: tensile strength (or tenacity) and tensile modulus (or modulus) of a yarn are defined and determined on multifilament yarns as specified in ASTM D885M (1995), using a nominal gauge length of the yarn of 500 mm, a crosshead speed of 50%/min and Instron 2714 clamps, of type "Fibre Grip D5618C". On the basis of the measured stress-strain curve the modulus is determined as the gradient between 0.3 and 1% strain using a pretension of 0.2 cN/tex. For calculation of the modulus and strength, the tensile forces measured are divided by the titre, as determined above; values in GPa are calculated assuming a density of 0.97 g/cm$^3$ for the HPPE.

Tensile strength and tensile modulus at break of the thermoplastic ethylene copolymer may be measured according ISO 527-2.

Short chain branches per 1000 total carbon (SCB/1000TC): is determined by NMR techniques and IR methods calibrated thereon. As an example the amount of methyl, ethyl or butyl short side chains are identical to the amounts of methyl side groups per thousand carbon atoms contained by the UHMWPE as determined by proton 1H liquid-NMR, hereafter for simplicity NMR, as follows:

3-5 mg of UHMWPE are added to a 800 mg 1,1',2,2'-tetracholoroethane-d$_2$ (TCE) solution containing 0.04 mg 2,6-di-tert-butyl-paracresol (DBPC) per gram TCE. The purity of TCE is >99.5% and of DBPC>99%.

The UHMWPE solution is placed in a standard 5 mm NMR tube which is then heated in an oven at a temperature between 140°-150° C. while agitating until the UHMWPE is dissolved.

The NMR spectrum is recorded at 130° C. e.g. with a high field 400 MHz NMR spectrometer using an 5 mm inverse probehead and set up as follows: a sample spinrate of between 10-15 Hz, the observed nucleus—1H, the lock nucleus—2H, a pulse angle of 90°, a relaxation delay of 30 sec, the number of scans is set to 1000, a sweep width of 20 ppm, a digital resolution for the NMR spectrum of lower than 0.5, a total number of points in the acquired spectrum of 64 k and a line broadening of 0.3 Hz.

The recorded signal intensity (arbitrary units) vs. the chemical shift (ppm), hereafter spectrum 1, is calibrated by setting the peak corresponding to TCE at 5.91 ppm.

After calibration, the two peaks (doublet) of about equal intensity are used to determine the amount of methyl side groups are the highest in the ppm range between 0.8 and 0.9 ppm. The first peak should be positioned at about 0.85 ppm and the second at about 0.86 ppm.

The deconvolution of the peaks is performed using a standard ACD software produced by ACD/Labs;

The accurate determination of the areas $A1_{methyl\ side\ groups}$, hereafter A1 of the deconvoluted peaks used to determine the amount of methyl side groups, i.e. $A1 = A1_{first\ peak} + A1_{second\ peak}$ is computed with the same software.

The amounts of methyl side groups per thousand carbon atoms, is computed as follows:

$$\text{methyl side groups} = 2 \times \frac{1000 \times \frac{A1}{3}}{A1 + A2 + A3};$$

wherein A2 is the area of the three peaks of the methyl end groups which are the second highest in the ppm range between 0.8 and 0.9 and are located after the second peak of the methyl side groups towards increasing the ppm range and wherein A3 is the area of the peak given by the CH2 groups of the main UHMWPE chain, being the highest peak in the entire spectrum and located in the ppm range of between 1.2 and 1.4.

Minimum creep rate of yarns may be determined as described in the published patent application WO2016001158. In particular as described in the section "Stabilizing creep and minimum creep rate in the fibers" of WO2016001158. The minimum creep rate of the yarns has been derived therein from a creep measurement applied on multifilament yarns by applying ASTM D885M (1995) standard method under a constant load of 900 MPa, at a temperature of 30° C. and then measuring the creep response (i.e. strain elongation, %) as a function of time. The minimum creep rate is determined by the first derivative of creep as function of time, at which this first derivative has the lowest value (e.g. the creep rate [1/s] of the yarn is plotted as function of strain elongation [%] of the yarn in a so-called known Sherby and Down diagram.)

CBOS 5 mm test (test set-up is schematically depicted in FIG. 2): 6 bends per machine cycle, rope diameter 5 mm, D/d 10, Tension 510 MPa (Load: 30% Minimum Breaking Load), in wet environment (water cooling: ambient temperature water sprayed (FIG. 2*a*—item 25) at bending zone area of the top sheave (21).

The cyclic bending over sheave (CBOS) performance was tested. Within this test the rope (20) is bend over three rolling sheaves (21, 22, 23) each having a diameter of 50 mm. The three sheaves were positioned in an upside down V-formation on a frame (24). The rope was placed over the sheaves in such way that the rope has a bending zone at each of the sheaves. The rope was placed under a specific load (30% MBL). The frame with the sheaves is cycled back and forth (indicated with an ← → arrow (G)) during which the rope is exposed to continuous bending over sheaves until the rope reaches failure (=break). One machine cycle represents the frame with the sheaves going back and forth once. This means that one machine cycle represents 6 bends (3 bends a time). The stroke length (L, see FIG. 2*c*, is the distance from start(S) to end (E)) of the rope was 45 cm long. The cycling period was 5 seconds per machine cycle.

One machine cycle contains a straight bend (90°) at A, reverse bend (180°) at B, followed by straight bend (90°) at C. Rope is alternately bend in opposite directions, one full cycle exists of 4 (90°) straight bends and 2 (180°) reverse bends.

One full cycles is 2 stroke lengths long.

Figure 3:
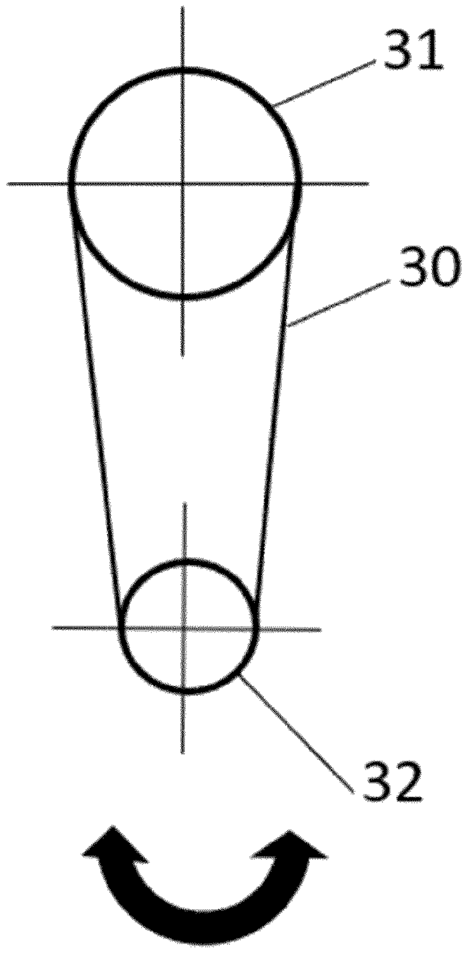

Cyclic bend-over-sheave (CBOS) 21 mm-A test (test set-up is schematically depicted in FIG. 3): rope diameter 21 mm, D/d 20. CBOS test: the bend fatigue of the rope was tested by bending the rope over a sheave. This is schematically depicted in FIG. 3. The test rope (30) was configured in an endless loop construction, meaning both rope ends have been connected with use of a splice termination. The loop had a circumference of about 6.5 m. The splice termination (often referred also to as a tucked splice) had an amount of tucks of 9 per rope side. Both splice-ends were not tapered. This loop was positioned over the large sheave on top (traction sheave (31)) and small bending sheave (32) in the bottom of the machine.

The rope was placed under load (Tension 280 MPa (this is 18% of the MBL)) and cycled back and forward over the sheave, at a stroke speed of 210 m/min, until the rope reached failure. Each machine cycle produced two straight-bent-straight bending cycles of the exposed rope section, the double bend zone. The double bend zone was approximately 14 times the diameter of the rope. The bending cycle time was 12 seconds per machine cycle (1 cycle is back and forth), in dry environment (no water cooling). The pause was 1 second between each cycle reversal. The pre-load for bedding in the rope was 5 times 14.5 metric tons.

Cyclic bend-over-sheave (CBOS) 21 mm—B test: the same as for CBOS 21 mm-A but with Tension 370 MPa.

Fairlead 10 mm test: rope diameter 10 mm, 2 abrasion cycles per machine cycle, 36 seconds per machine cycle—C2 fairlead (DIN 81915) D/d 20, Tension 380 MPa (Load: 25% MBL), in dry environment (no water cooling).

Figure 4:
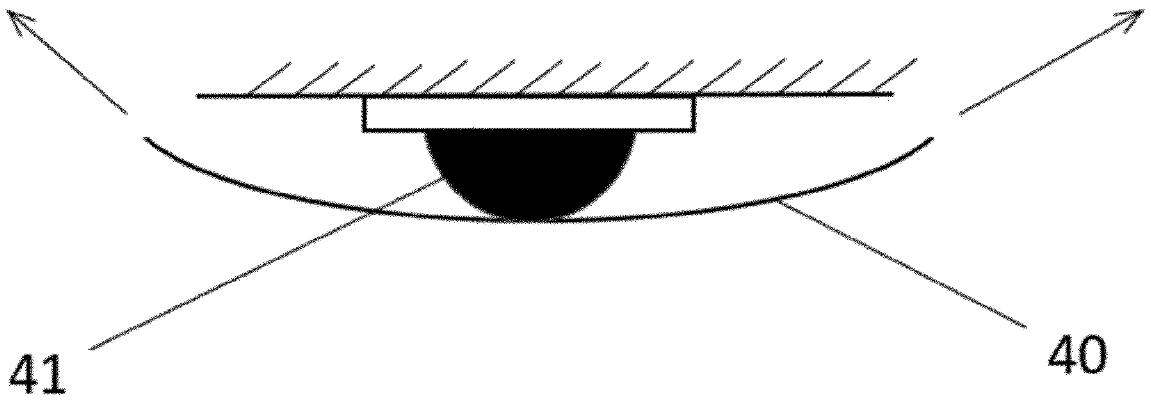
Figure 5:
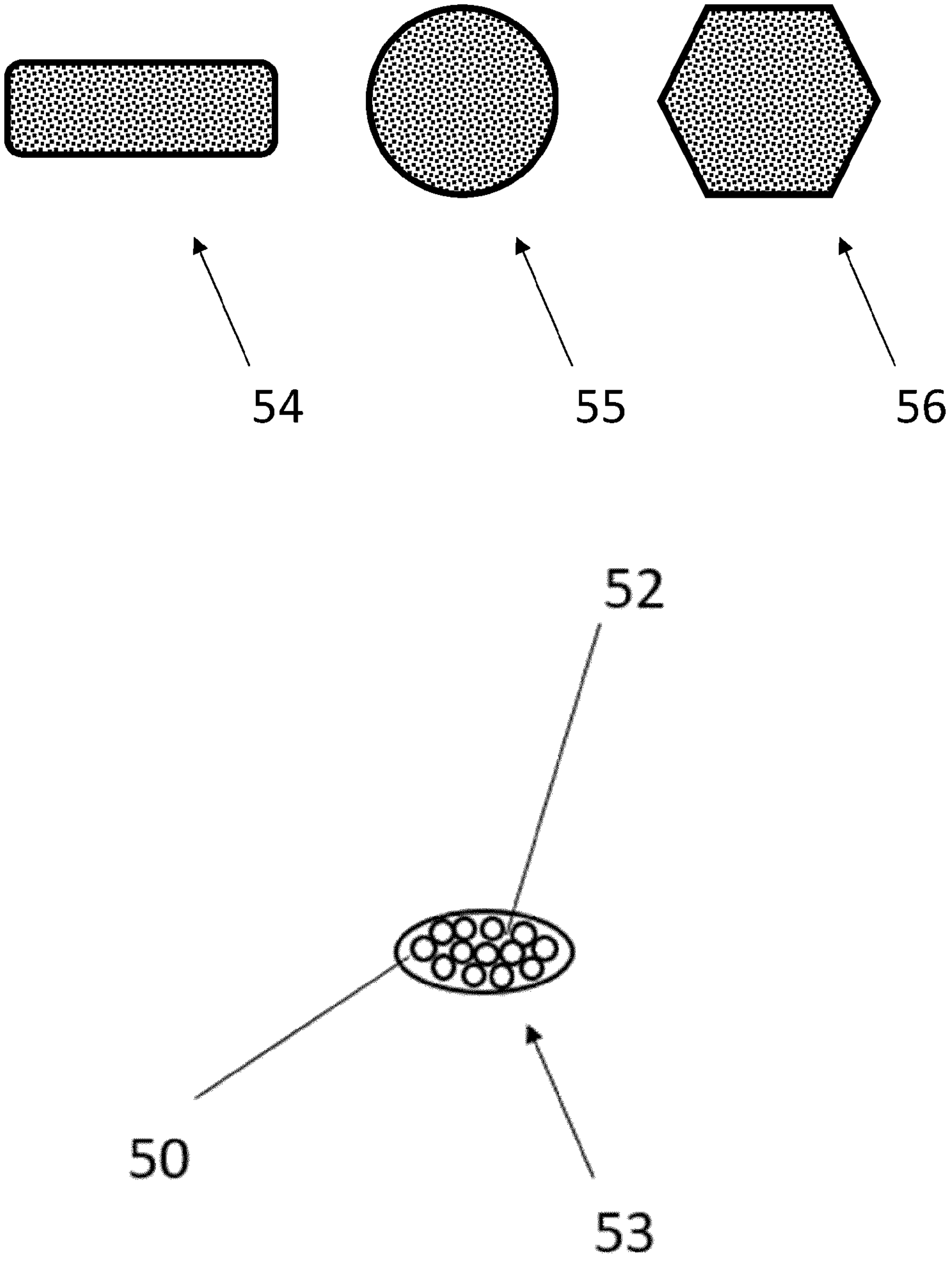
Figure 6:
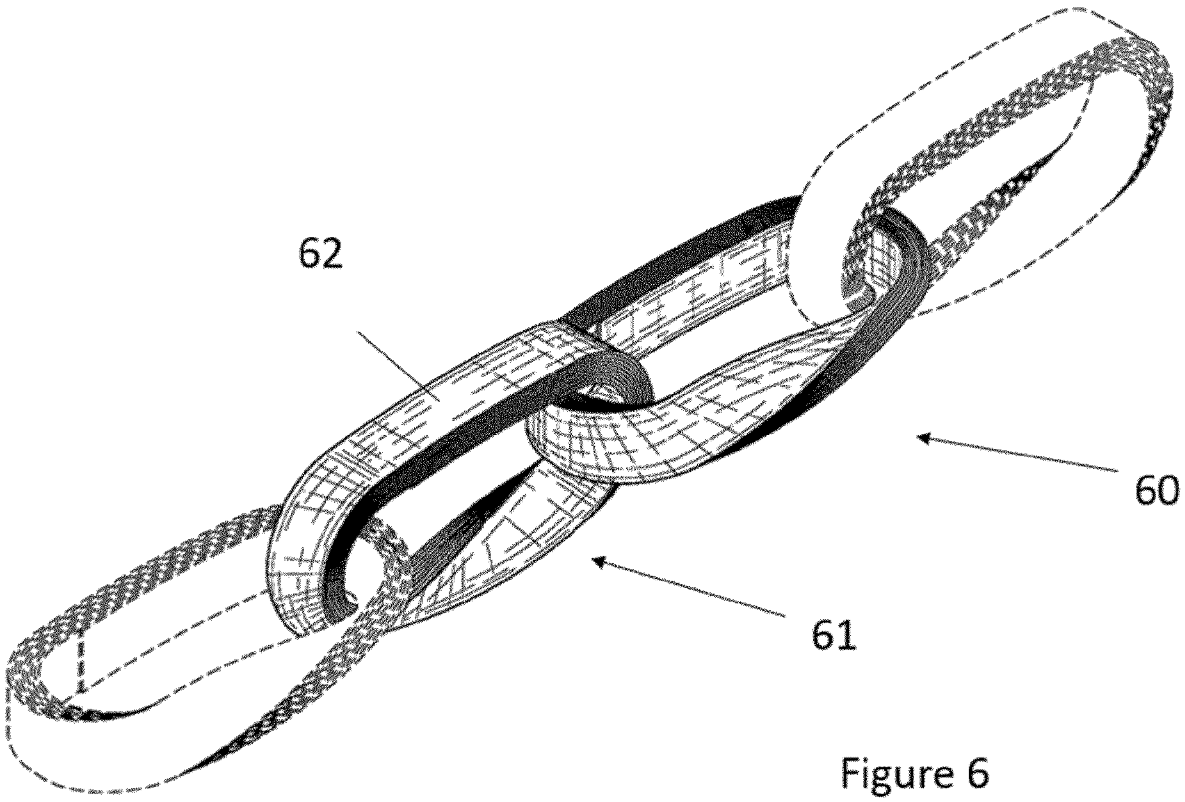
Figure 7:
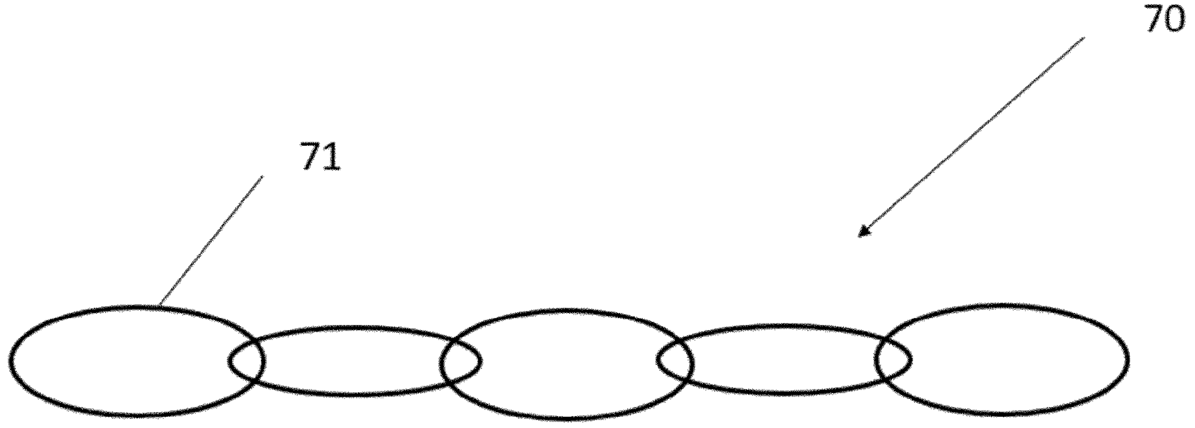

The fairlead abrasion performance was tested. This is schematically depicted in FIG. 4. Within this test the rope (40) is moved under a specific load (1800 kg) over a fairlead (41). One machine cycle represents the rope being pulled over the surface back and forth once. The rope was cycled back and forth until failure. The cycling period was 36 seconds per machine cycle. The stroke length of the rope was 56 cm long.

Figure 8A:
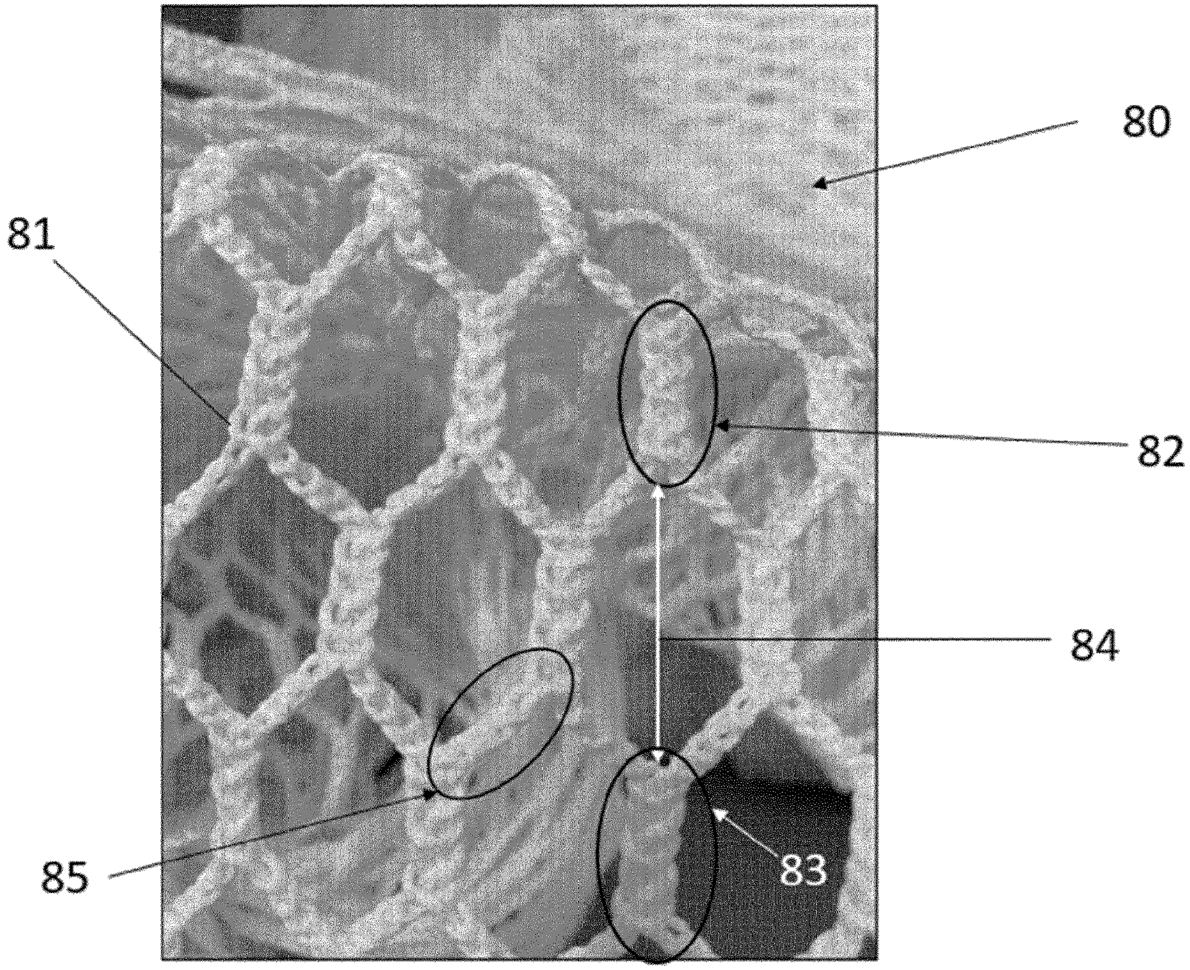
Figure 8B:
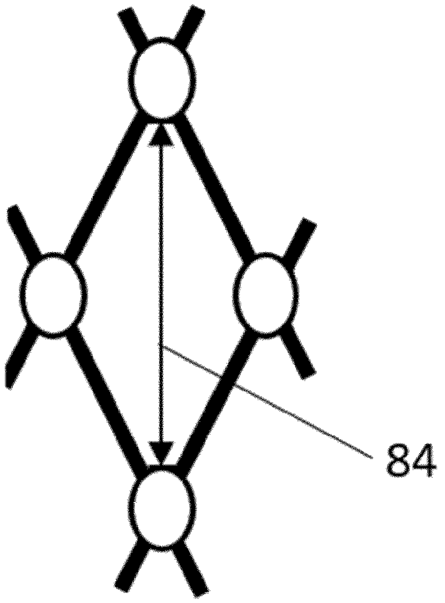
Figure 9:
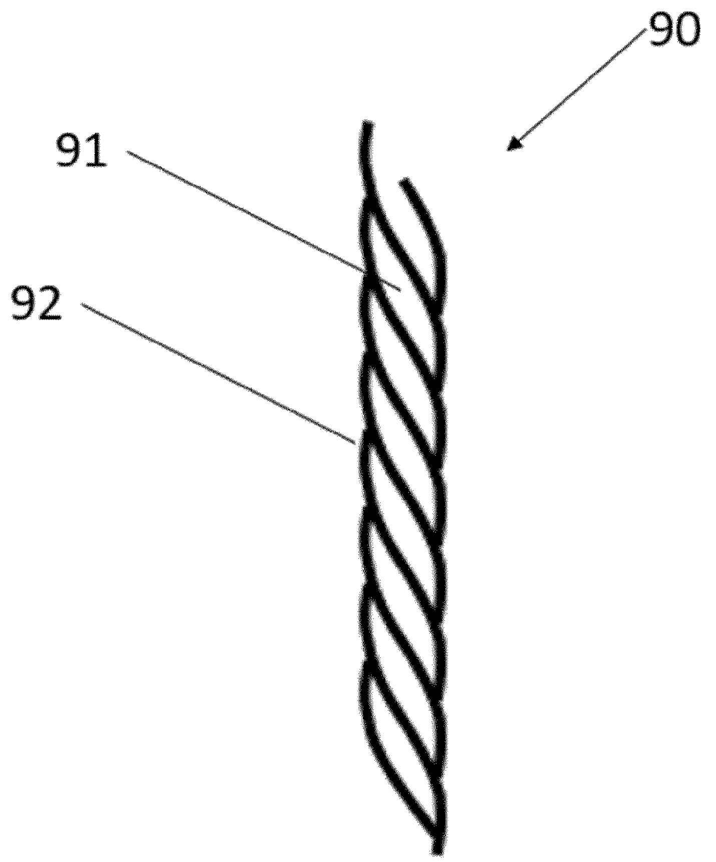
Figure 10:
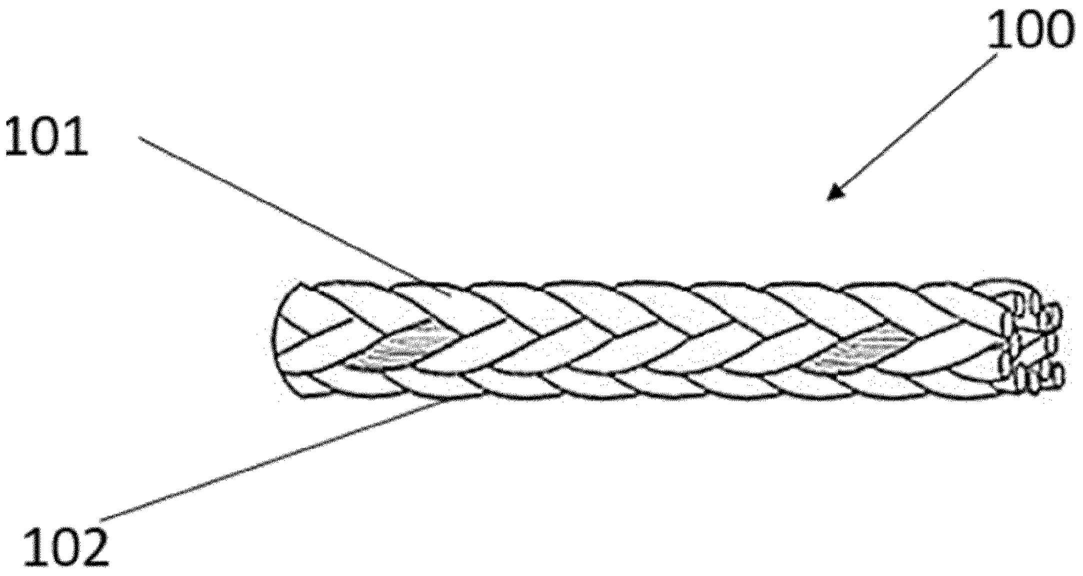
Figure 11:
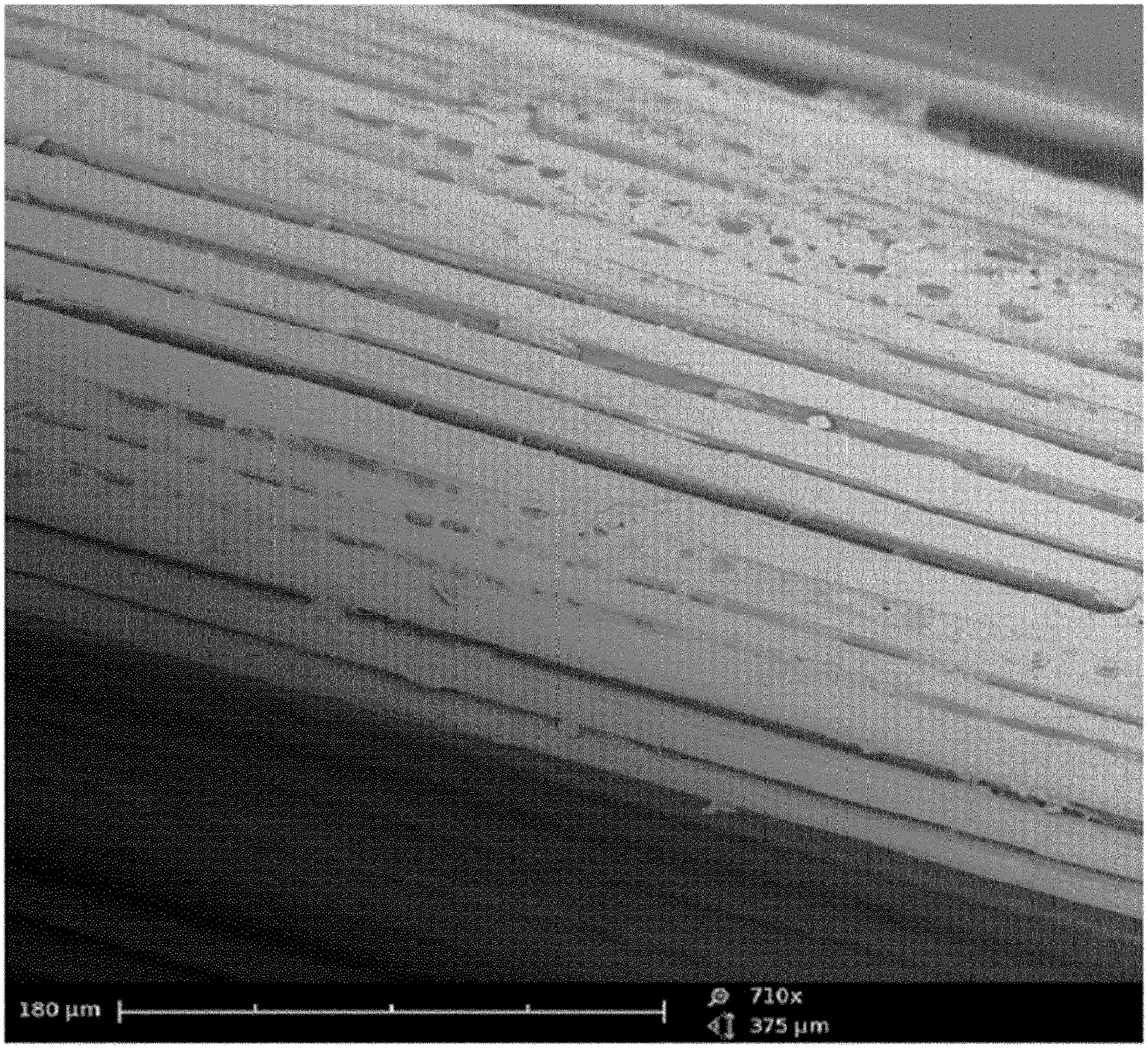
FIG. 11 shows a SEM picture of a surface of a composite elongated body.

Mesh size of a net, to also determine shrinkage of net after a period of use or a treatment, is measured based on ISO 16663. This standard was used as guideline, as it is applicable to active and passive fishing nets and not directly for measuring the mesh size of Raschel knotless nets. The mesh size has been measured full mesh/inside mesh (FMG—Full Mesh Gauge, maximum inside measured between the 2 opposite joints of a stretched mesh). For a knotless netting, the inside distance between two opposite joints in the same mesh when fully extended along its longest possible axis; which is illustrated by nr 84 in FIG. 8*b*. Measurements are done using a digital caliper, by inserting the two jaws into the diagonal of the mesh to be measured. The sliding hinged jaw is then pulled steadily away from the fixed jaw by the handle until the mesh is stretched and until there is slight resistance of the stretched mesh on the handle. The mesh size is read from the screen, while maintaining the gauge in this position. Reported values are the average of 5 measurements. As there may be some subjectivity in reproducing the tension level of slight resistance, all tests were performed by the same operator.

Mesh breaking strength of a net, like a knotless raschel net, is determined according to ISO 1806, using of a Zwick 1484 tensile tester.

EXPERIMENTS

The following examples are given by way of non-limiting reference only.

Materials

Paramelt™ Aquaseal X2050 (also referred to as X2050 herein) is a water based dispersion, formulated with unplasticized high molecular weight thermoplastic ethylene copolymers, which is totally solvent free. Solids content 44%, pH 11, a milky white liquid, with a Viscosity (Dynamic @ 20 C) of 150 mPas. This thermoplastic ethylene copolymer has a melting peak at 76.7° C. and heat of fusion of 21.9 J/g. It was purchased from Paramelt Veendam B.V., Veendam The Netherlands. Paramelt™ Aquaseal X2050 is also referred to herein as Paramelt X2050 or as Aqualseal X2050.

Wacker® ölemulsion C 800 (also referred to as C800 herein, commercial name OELEM C 800) is a non-ionic microemulsion of a non-reactive polydimethylsiloxane. It is a polydimethylsiloxane emulsion in water. It was purchased from Wacker Chemie AG, München, Germany. pH 5-7. Solids content approx. 80 mass %. The viscosity of the non-reactive polydimethylsiloxane of C800 as determined by the method described in the METHODS section herein is 16.5 Pa·s.

A combination of Syl-off @ 7950 Emulsion Coating and Syl-off @ 7922 Catalyst Emulsion from Dow Corning (also referred as Reactive Polysiloxane in Table 5 and 6 below).

A coating composition was prepared from a first emulsion comprising a reactive silicone polymer preformulated with a cross-linker and a second emulsion comprising a silicone polymer and a metal catalyst. The first emulsion was an emulsion available from Dow Corning containing 30.0-60.0 wt % of dimethylvinyl-terminated dimethyl siloxane and 1.0-5.0 wt % of dimethyl, methylhydrogen siloxane (Syl-off @7950 Emulsion Coating, active content 40%). The second emulsion was an emulsion available from Dow Corning containing 30.0-60.0 wt % of dimethylvinyl-terminated dimethyl siloxane and a platinum catalyst (Syl-off @ 7922 Catalyst Emulsion, active content 40%). The first emulsion and the second emulsion were mixed at a weight ratio of 8.3:1. The mixture having 40% solids.

Wacker® W23 (also referred as Wacker W23 herein), is a white, waxy polymethylsiloxane that is resistant to hydrolysis and exhibits a very high affinity to various substrates. Melting point 39-45.0° C. Dynamic viscosity (Brookfield, 50° C.) 300 mPa·s. In the examples where the polysiloxane was Wacker 23, the Wacker W23 was first mixed with water as follows: on weight basis 20% Wacker W23 (solid) and 80% water were combined and stirred by use of a shear mixer for approximately 1 hour on 8000 tpm. This mixture was then used to make the coating compositions.

DOW XIAMETER™ PMX-200 Silicone Fluid (also referred as Xiameter 200 herein), which is a colourless, clear polydimethylsiloxane fluid.

Manufacturing of the Coating Composition

Paramelt X2050 (comprises copolymer) and Wacker® ölemulsion C 800 (comprises PDMS) were mixed by adding the C800 to X2050 at room temperature and stirring for 15 min.

Manufacturing of the Comparative Coating Compositions, 1C, 2C, 3C

A comparative coating composition was prepared (polyolefin dispersion) by diluting Aquaseal X2050 by water in the amount of 1:1.

The following polymeric compositions were made

TABLE 1

| Coating composition (dipping dispersions) Sample x | Weight Ratio copolymer:PDMS in the coating composition | Composite Elongated Body (CEB) CEB-Sx |
|---|---|---|
| Sample 1 | 80:20 | CEB-S1 |
| Sample 1C (comparative) | 100 | CEB-S1C |
| Sample 2 | 75:25 | CEB-S2 |
| Sample 2C (comparative) | 100 | CEB-S2C |
| Sample 3-1 | 99:1 | CEB-S3-1 |
| Sample 3-5 | 95:5 | CEB-S3-5 |
| Sample 3-10 | 90:10 | CEB-S3-10 |
| Sample 3-25 | 75:25 | CEB-S3-25 |
| Sample 3C (comparative) | 100 | CEB-S3C |

Manufacturing of a Composite Elongated Body (CEB)

A HPPE yarn (Dyneema® 1760 SK78, yarn tenacity 34.5 cN/dtex, filament tenacity 37 cN/dtex, Modulus 1190 cN/dtex, from DSM Protective materials BV, The Netherlands) was impregnated by dipping in the coating composition Sample x (see table 1). The wetted yarns were fed first through a die and then in seven passes through an hot air oven with a length of 6 meters with an inlet speed of 50 m/min and an outlet speed of 50 m/min. The oven temperature was set at 120° C. The obtained dried monofilament-like product (composite elongated body Sx=CEB-Sx) contained about 15 mass % polymeric composition and 85 mass % was fibrous material (filaments).

This way all composite elongated bodies as listed in table 1 were made using the coating compositions as listed in table 1. All contained 15 mass % polymeric composition and 85 mass % was fibrous material (filaments).

Rope Example 1 (5 mm)

CEB-S1 was manufactured as described above under Manufacturing of a composite elongated body (CEB) using coating composition Sample 1.

CEB-S1 was used to produce 5 mm ropes (Rope Example 1 having 5 mm diameter), each having 48 single yarns divided over 12 strands. The rope contained 12 strands, (round)braided in 6 clockwise oriented strands and 6 counter-clockwise oriented strands, each strand contained a 20 turns per meter twisted assembly of 4 CEB-S1 monofilament-like products, braiding pitch was 7 times the diameter of the rope.

Comparative Rope Example 1C: (5 mm)

CEB-S1C was used to produce 5 mm comparative ropes (Comparative Rope Example 1C), with the same method as for Rope Example 1 (5 mm) above.

Rope Example 2 (21 mm)

CEB-S2 was manufactured as described above under Manufacturing of a composite elongated body (CEB) using coating composition Sample 2.

CEB-S2 was used to produce 21 mm ropes (Rope example 2 having a 21 mm diameter), each rope contained 12 strands, (round)braided in 6 clockwise oriented strands and 6 counter-clockwise oriented strands, each strand contained 7 rope yarns that were assembled by means of stranding (13.3 turns per meter), each rope yarn being a 15 turns per meter twisted assembly of 15 CEB-S2 monofilament-like products, braiding pitch was 7 times the diameter of the rope.

Comparative Rope Example 2C: (21 mm)

CEB-S2C was used to produce 21 mm comparative ropes (Comparative Rope Example 2C), with the same method as for Rope Example 2 (21 mm) above.

Rope Examples 3 (10 mm): 3-1, 3-5, 3-10 and 3-25

CEB-S3-1, CEB-S3-5, CEB-S3-10 and CEB-S3-25 were manufactured as described above under Manufacturing of a composite elongated body (CEB) using coating composition Samples 3-1, 3-5, 3-10 and 3-25 respectively.

Rope Example 3-1

CEB-S3-1 was used to produce 10 mm ropes (10 mm diameter). Each rope contained 12 strands, (round)braided in 6 clockwise oriented strands and 6 counter-clockwise oriented strands, each strand contained a 18 turns per meter twisted assembly of 20 CEB-S3-x monofilament-like products, braiding pitch was 7 times the diameter of the rope. This way Rope Example 3-1 was made.

Rope Examples 3-5, 3-10 and 3-25

Rope Examples 3-5, 3-10 and 3-25 were made in the same was as described for Rope Example 3-1 using CEB-S3-5, CEB-S3-10 and CEB-S3-25 respectively.

Comparative Rope Example 3C: (10 mm)

CEB-S3C was used to produce 10 mm comparative ropes (Comparative Rope Example 3C), with the same method as for Rope Example 3-1.

CBOS Test

The ropes from Rope Example 1 and comparative Rope Example 1C were subjected to the CBOS 5 mm test as described above.

The ropes from Rope Example 2 and comparative Rope Example 2C were subjected to the CBOS 21 mm test as described above.

Table 2 reports the CBOS test results. As can be seen in table 2 the number of bending cycles of Rope Example 1 is much higher than of comparative Rope Example 1C: Rope Example 1 demonstrates an improved bending performance.

As can be seen in table 2 the number of bending cycles of Rope Example 2 is much higher than of comparative Rope Example 2C: Rope Example 2 demonstrates an improved bending performance.

TABLE 2

| Rope Example | Nr of Bending cycles CBOS TEST (average of [x] measurements*) |
|---|---|
| Comparative Rope Example 1C X2050 (5 mm) | 312 [3] (CBOS 5 mm) |
| Rope Example 1 X2050 + C800 (5 mm) | 7316 [3] CBOS (5 mm) |
| Comparative Rope Example 2C X2050 (21 mm) | 8818 [1] @280 MPa (CBOS 21 mm-A) |
| Rope Example 2 X2050 + C800 (21 mm) | 64234 [1] @280 MPa (CBOS 21 mm-A) |
| Comparative Rope Example 2C X2050 (21 mm) | 4498 [1] @370 MPa (CBOS 21 mm-B) |
| Rope Example 2 X2050 + C800 (21 mm) | 16891[1] @370 MPa (CBOS 21 mm-B) |

*each time a fresh rope sample was used

Fairlead Test

The ropes from Rope Examples 3-1, 3-5, 3-10, 3-25 and comparative Rope Example 3C were subjected to the Fairlead 10 mm test as described above.

Table 3 reports the Fairlead test results. As can be seen in table 3 the number of bending cycles of Examples 3 is higher than of comparative Example 30.

The higher number of bending cycles over the static contra-surface (i.e. the fairlead) of Example 3 compared to comparative Example 30 demonstrate an improved abrasion performance.

TABLE 3

| Rope Example 10 mm (% of total solids) | Fairlead Bending cycles (average of [x] measurements*) |
|---|---|
| Comparative Rope Example 3C X2050 | 12 [3] |
| Rope Example 3-1 X2050 + C800 (1%) | 23 [3] |
| Rope Example 3-5 X2050 + C800 (5%) | 31 [3] |
| Rope Example 3-10 X2050 + C800 (10%) | 37 [3] |
| Rope Example 3-25 X2050 + C800 (25%) | 205 [3] |

*each time a fresh rope sample was used

Manufacturing of Further Coating Compositions

Paramelt X2050 (comprises copolymer) and a polysiloxane were mixed by adding the polysiloxane to X2050 at room temperature and stirring for 15 min.

All coating mixtures contained 20% solids concentration.

Within this 20% solids percentage the formulations were varied as given in table 4.

A comparative coating composition was prepared (polyolefin dispersion) by diluting Aquaseal X2050 with water in the amount of 1:1 to obtain 20% solids.

The test results with these mixtures are listed in tables 5 and 6 below.

TABLE 4

| Polysiloxane (weight % polysiloxane based on total weight of solids) | X2050 (weight % X2050 based on total weight of solids) | |
|---|---|---|
| 0% polysiloxane | 100% X2050 | Sample 4C (Comparative) |
| 1% polysiloxane | 99% X2050 | |
| 5% polysiloxane | 95% X2050 | |
| 10% polysiloxane | 90% X2050 | |
| 25% polysiloxane | 75% X2050 | |

Manufacturing of Ropes and Testing 5 mm Rope (Table 5)

A HPPE yarn (Dyneema® 1760 SK78, yarn tenacity 34.5 cN/dtex, filament tenacity 37 cN/dtex, Modulus 1190 cN/dtex, from DSM Protective materials BV, The Netherlands) was used to produce 5 mm ropes, each rope having 48 single yarns divided over 12 strands. The rope contained 12 strands, (round)braided in 6 clockwise oriented strands and 6 counter-clockwise oriented strands, each strand contained a 20 turns per meter twisted assembly of 4 yarns, braiding pitch was 7 times the diameter of the rope. Thereafter the rope was dipped in the coating composition. The coated rope was dried in the oven at 110° C. during 20 minutes.

Thereafter the ropes were subjected to the "CBOS 5 mm test" as described above. The results are listed in Table 5.

As can be seen in table 5 the number of bending cycles of Examples comprising polysiloxane are higher than of the Comparative. This way an improved bending performance is demonstrated.

10 mm Ropes (Table 6)

A HPPE yarn (Dyneema® 1760 SK78, yarn tenacity 34.5 cN/dtex, filament tenacity 37 cN/dtex, Modulus 1190 cN/dtex, from DSM Protective materials BV, The Netherlands) was used to produce 10 mm ropes. Each rope contained 12 strands, (round)braided in 6 clockwise oriented strands and 6 counter-clockwise oriented strands, each strand contained a 18 turns per meter twisted assembly of 20 yarns, braiding pitch was 7 times the diameter of the rope. Thereafter the rope was dipped in the coating composition.

The coated rope was dried in the oven at 110° C. during 20 minutes. Thereafter the ropes were subjected to the "Fairlead 10 mm test" as described above. The results are listed in Table 6. As can be seen in table 6 the number of bending cycles of Examples comprising polysiloxane are higher than of the Comparative. This way an improved abrasion resistance is demonstrated.

The higher number of cycles over the static contra-surface (i.e. a fairlead) demonstrate an improved abrasion performance.

TABLE 5

| Coating composition X2050 + Polysiloxane used to manufacture CE-4 (weight % polysiloxane based on total weight of solids) | Nr of Bending cycles CBOS = 5 mm test (average of [x] measurements*) Rope: 5 mm diameter |
|---|---|
| | [3] (average of 3 measurements) |
| 0% = 100% X2050 Comparative | 356 |
| 1% Reactive Polysiloxane | 825 |
| 5% Reactive Polysiloxane | 1160 |
| 10% Reactive Polysiloxane | 1832 |
| 25% Reactive Polysiloxane | 2887 |
| 1% Wacker W23 | 905 |
| 5% Wacker W23 | 1058 |
| 10% Wacker W23 | 1321 |
| 25% Wacker W23 | 2152 |
| 1% Xiameter 200 | 660 |
| 5% Xiameter 200 | 904 |
| 10% Xiameter 200 | 1749 |
| 25% Xiameter 200 | 2544 |

*each time a fresh rope sample was used

TABLE 6

| Coating composition X2050 + Polysiloxane used to manufacture CE-5 (% polysiloxane based on total weight of solids) | Fairlead Bending cycles (average of [x] measurements*) Rope: 10 mm diameter |
|---|---|
| | [3] (average of 3 measurements) |
| 0% = 100% X2050 Comparative | 9 |
| 1% Reactive Polysiloxane | 11 |
| 5% Reactive Polysiloxane | 13 |
| 10% Reactive Polysiloxane | 21 |
| 25% Reactive Polysiloxane | 29 |
| 1% Wacker W23 | 11 |
| 5% Wacker W23 | 14 |
| 10% Wacker W23 | 14 |
| 25% Wacker W23 | 19 |
| 1% Xiameter 200 | 15 |
| 5% Xiameter 200 | 18 |
| 10% Xiameter 200 | 27 |
| 25% Xiameter 200 | 45 |

*each time a fresh rope sample was used

The invention claimed is:

1. A composite elongated body comprising:

high performance polyethylene HPPE filaments having a tenacity of at least 0.6 N/tex and a polymeric composition present throughout the composite elongated body, wherein the polymeric composition comprises:

a) a thermoplastic ethylene copolymer; and b) a polysiloxane; and wherein the thermoplastic ethylene copolymer and the polysiloxane are present in a mass ratio of the thermoplastic ethylene copolymer to the polysiloxane of 1:1 to 20:1; and wherein the polymeric composition has a peak melting temperature in the range from 40 to 140° C., measured in accordance with ASTM E794-06.

2. The composite elongated body according to claim 1, wherein the high performance polyethylene HPPE filaments are provided as a yarn, said yarn comprising at least two HPPE filaments having a tenacity of at least 0.6 N/tex.

3. The composite elongated body according to claim 1, wherein the polysiloxane is a polydimethylsiloxane.

4. The composite elongated body according to claim 1, wherein the polydimethylsiloxane is a non-reactive polydimethylsiloxane.

5. A lengthy body comprising the composite elongated body according to claim 1.

6. The lengthy body according to claim 5, wherein the lengthy body is a strand, a cable, a cord, a rope, a belt, a strip, a hose or a tube.

7. An article comprising at least one lengthy body according to claim 5, wherein the article is a synthetic chain, a sling, a net or a personal protection item.

8. A method of manufacturing an article comprising the step of producing the article from the lengthy body according to claim 5.

9. The method according to claim 8, wherein the article is a net, a synthetic chain or a personnel protection item.

10. A crane comprising a sheave and a rope comprising at least three composite elongated bodies according to claim 1.

11. A method of manufacturing a lengthy body comprising the step of assembling at least two composite elongated bodies according to claim 1 to form the lengthy body.

12. The method of claim 11, wherein the lengthy body is a rope.

13. The method of claim 12, wherein the rope is a laid or braided rope.

14. A method of lifting and/or placement of an object comprising the steps of:

a) providing a rope comprising at least three composite elongated bodies according to claim 1;

b) connecting the rope to the object to be lifted; and c) using the rope to lift and/or place the object.

15. The composite elongated body according to claim 1, wherein the mass ratio of the thermoplastic ethylene copolymer to the polysiloxane is from 1:1 to 10:1.

16. A method of manufacturing an article comprising the step of producing the article from the composite elongated body according to claim 15.

17. The method according to claim 16, wherein the article is a net, a synthetic chain or a personnel protection item.

18. A method of manufacturing an article comprising the step of producing the article from the composite elongated body according to claim 1.

19. The method according to claim 18, wherein the article is a net, a synthetic chain or a personnel protection item.

20. A method of manufacturing a composite elongated body comprising the steps:

a) providing a coating composition comprised of:

a1) a thermoplastic ethylene copolymer having a peak melting temperature in the range from 40 to 140° C., measured in accordance with ASTM E794-06;

a2 water; and a3) 0.5-20 mass % of a polysiloxane, based on total mass of the coating composition;

b) providing at least two HPPE filaments, the filaments having a tenacity of at least 0.6 N/tex;

c) applying the coating composition to the filaments to obtain coated filaments; and d) elevating the temperature of the coated filaments to obtain the composite elongated body.

21. The method according to claim 20, wherein step d) comprises elevating the temperature sufficient to dry the coating composition and melt the thermoplastic ethylene copolymer.

22. The method of claim 20, wherein the aqueous coating composition contains 1.0-15 mass % of the polysiloxane, based on the total mass of the coating composition.

23. A composite elongated body comprising:

high performance polyethylene HPPE filaments having a tenacity of at least 0.6 N/tex, and a polymeric composition present throughout the composite elongated body, wherein the polymeric composition comprises:

a) a thermoplastic ethylene copolymer having a peak melting temperature in the range from 40 to 140° C., measured in accordance with ASTM E794-06; and b) a polysiloxane; wherein the thermoplastic ethylene copolymer and the polysiloxane are present in a mass ratio of the thermoplastic ethylene copolymer to the polysiloxane of 2:1 to 5:1.

24. The composite elongated body according to claim 23, wherein the high performance polyethylene HPPE filaments are provided as a yarn which comprises at least two HPPE filaments having a tenacity of at least 0.6 N/tex.

25. The composite elongated body according to claim 23, wherein the polysiloxane is a polydimethylsiloxane.

26. The composite elongated body according to claim 25, wherein the polydimethylsiloxane is a non-reactive polydimethylsiloxane.

27. A lengthy body comprising the composite elongated body according to claim 23.

28. The lengthy body according to claim 27 wherein the lengthy body is a strand, a cable, a cord, a rope, a belt, a strip, a hose or a tube.

29. An article comprising at least one lengthy body according to claim 27, wherein the article is a synthetic chain, a sling, a net or a personal protection item.

30. A crane comprising a sheave and a rope comprising at least three composite elongated bodies according to claim 23.

* * * * *